(12) United States Patent
Zhou

(10) Patent No.: US 11,445,511 B2
(45) Date of Patent: Sep. 13, 2022

(54) METHOD FOR INFORMATION TRANSMISSION ADJUSTMENT, BASE STATION, AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 260 days.

(21) Appl. No.: 16/637,739

(22) PCT Filed: Aug. 10, 2017

(86) PCT No.: PCT/CN2017/096758
§ 371 (c)(1),
(2) Date: Feb. 8, 2020

(87) PCT Pub. No.: WO2019/028726
PCT Pub. Date: Feb. 14, 2019

(65) Prior Publication Data
US 2020/0214015 A1    Jul. 2, 2020

(51) Int. Cl.
H04W 4/00 (2018.01)
H04W 72/04 (2009.01)
(Continued)

(52) U.S. Cl.
CPC ....... H04W 72/0493 (2013.01); H04L 5/0092 (2013.01); H04W 4/80 (2018.02);
(Continued)

(58) Field of Classification Search
None
See application file for complete search history.

(56) References Cited

U.S. PATENT DOCUMENTS

2014/0355437 A1    12/2014    Damodaran et al.
2015/0103715 A1    4/2015    Chen et al.
(Continued)

FOREIGN PATENT DOCUMENTS

CN    102007808 A    4/2011
CN    105612801 A    5/2016
(Continued)

OTHER PUBLICATIONS

First Office Action of the Chinese application No. 201780000846.7, dated Mar. 30, 2021.
(Continued)

Primary Examiner — Zewdu A Beyen
(74) Attorney, Agent, or Firm — Syncoda LLC; Feng Ma

(57) ABSTRACT

A method for information transmission adjustment includes: determining control resource adjustment information for a target UE, the control resource adjustment information being control resource adjustment information based on original scheduling that has been adjusted; sending the control resource adjustment information to the target UE, so that the target UE monitors downlink control information in the time-frequency range to which adjusted control resources belong; based on the control resource adjustment information and the time-frequency resource range of the original scheduling, allocating transmission resources for the target UE, the frequency range of transmission resources including: the frequency range of the adjusted control resources; then performing information transmission between the base station and target UE. The method for information transmission adjustment can therefore enhance scheduling adjustment efficiency and reduce transmission delays caused by scheduling adjustment.

20 Claims, 31 Drawing Sheets

(51) Int. Cl.
    *H04W 4/80*     (2018.01)
    *H04L 5/00*     (2006.01)
    *H04W 72/12*     (2009.01)

(52) U.S. Cl.
    CPC ..... *H04W 72/042* (2013.01); *H04W 72/0446* (2013.01); *H04W 72/0453* (2013.01); *H04W 72/1268* (2013.01)

(56) References Cited

U.S. PATENT DOCUMENTS

| | | | |
|---|---|---|---|
| 2015/0103777 A1 | 4/2015 | Chen et al. | |
| 2015/0319764 A1 | 11/2015 | Damodaran et al. | |
| 2016/0081033 A1* | 3/2016 | Ouchi | H04W 52/248 455/522 |
| 2016/0261514 A1 | 9/2016 | Gopinathan et al. | |
| 2016/0261515 A1 | 9/2016 | Gopinathan et al. | |
| 2016/0261516 A1 | 9/2016 | Gopinathan et al. | |
| 2017/0339683 A1 | 11/2017 | Chen et al. | |

FOREIGN PATENT DOCUMENTS

| | | |
|---|---|---|
| CN | 105939539 A | 9/2016 |
| JP | WO2014141965 A1 | 2/2017 |
| WO | 2011160536 A1 | 12/2011 |

OTHER PUBLICATIONS

HTC. 3GPP TSG RAN WG1 Meeting #89 R1-1708538 Configuration for Search Spaces and Control Resource Sets. May 19, 2017 (May 19, 2017), section 2.

Interdigital et al: "Bandwidth Adaptation via BWP Selection in NR", 3GPP Draft; R1-1710878 (R15 NR WI AI 517 BWP Selection), 3rd Generation Partnership Project (3GPP), Mobile Competence Centre 650, Route Des Lucioles; F-06921 Sophia-Antipolis Cedex; France, vol. RAN WG1, No. Qingdao, China; Jun. 27, 2017-Jun. 30, 2017 Jun. 26, 2017 (Jun. 26, 2017), XP051300080, the whole document.

Huawei et al:"On bandwidth part and bandwidth adaptation", 3GPP Draft; R1-1706900, 3rd Generation Partnership Project (3GPP), Mobile Competence Centre; 650, Route Des Lucioles; F-06921 Sophia-Anti Polis Cedex; France, vol. RAN WG1, No. Hangzhou, China; May 15, 2017-May 19, 2017 May 6, 2017 (May 6, 2017), XP051261558, chapter 5-6; figures 3a-c, 4.

International Search Report in the international application No. PCT/CN2017/096758, dated Apr. 28, 2018.

English translation of the Written Opinion of the International Search Authority in the international application No. PCT/CN2017/096758, dated Apr. 28, 2018.

Supplementary European Search Report in the European application No. 17921405.1, dated Jul. 1, 2020.

Office Action of the Indian application No. 202047009709, dated Nov. 9, 2021.

* cited by examiner

METHOD FOR INFORMATION TRANSMISSION ADJUSTMENT, BASE STATION, AND USER EQUIPMENT

CROSS-REFERENCE TO RELATED APPLICATION

The present application is a national stage of International Application No. PCT/CN2017/096758 filed on Aug. 10, 2017, the disclosure of which is hereby incorporated by reference in its entirety.

TECHNICAL FIELD

The present disclosure relates to the technical field of communications, and more particularly, to a method for adjusting information transmission, a base station, and a user equipment (UE).

BACKGROUND

The frequency deployed in 5G new radio (NR) is mostly within a higher frequency interval, for example from 3.3 GHz to 24 GHz, and thus frequency range of each carrier in a 5G NR system may be substantially larger than that in a 4G long term evolution (LTE) system. In a 5G network, the bandwidth of a single band is close to 1 GHz, and the bandwidth of a single carrier is between 80 MHz and 400 MHz. A single carrier may be divided into multiple band width parts (BWPs) from consideration of energy saving of a UE of the 5G network, etc., and the UE may be scheduled on one or more BWPs.

A base station may timely adjust a BWP time-frequency range for scheduling the UE according to changes in the current traffic to be transmitted or power consumption of the UE or the like. For example, scheduling of the UE on a BWP with a wider bandwidth, such as 40 MHz, is adjusted to scheduling of the UE on a BWP with a narrower bandwidth, such as 20 MHz.

In a related art, the above manner of adjusting the BWP includes: deactivating the current BWP and activating a new BWP with a narrow bandwidth. Because it is required to reconfigure transmission control information for the new BWP, a long conversion time is necessary, resulting in increase of transmission delay and influence on the user experience of 5G network devices.

SUMMARY

To overcome the problems in the related art, the embodiments of the present disclosure provide a method for adjusting information transmission, a base station, and a UE, which reduce transmission delays caused by scheduling transmission.

According to a first aspect of the embodiments of the present disclosure, a method for adjusting information transmission is provided. The method may be applied to a base station. The method may include the following operations.

Control resource adjustment information for a target UE is determined, the control resource adjustment information being information of control resources adjusted based on original scheduling;

The control resource adjustment information is sent to the target UE to enable the target UE to monitor downlink control information (DCI) in a time-frequency range to which the adjusted control resources belong;

Transmission resources are allocated to the target UE according to the control resource adjustment information and a time-frequency resource range for the original scheduling, a frequency range of the transmission resources at least including: a frequency range of the adjusted control resources; and Information transmission with the target UE is performed through the transmission resources.

In some embodiments, the control resource adjustment information may include at least one of the following:

a time-frequency position of any one of one or more target control resource sets (CORESETs) of all CORESETs in a BWP;

a time-frequency position of a part of control resource regions in any one of the one or more CORESETs of all the CORESETs; and a binding number of search resource element groups (REGs) for a target control resource.

In some embodiments, the operation that control resource adjustment information for a target UE is determined may include that:

the control resource adjustment information is determined according to an amount of information to be transmitted; or the control resource adjustment information is determined in response to a scheduling adjustment request from the target UE.

In some embodiments, the operation that the control resource adjustment information is determined according to the amount of information to be transmitted may include that:

a present amount of information to be transmitted by the base station on a BWP is compared with a first preset threshold to obtain a comparison result, a time-frequency range of the BWP including a time-frequency range for the original scheduling; and the control resource adjustment information for the target UE is determined in condition that the comparison result meets a first preset adjustment condition.

In some embodiments, the operation that the control resource adjustment information is determined according to the amount of information to be transmitted may include that:

a present amount of information to be transmitted for the target UE is determined;

the present amount of information to be transmitted is compared with a second preset threshold to obtain a comparison result; and the control resource adjustment information for the target UE is determined in condition that the comparison result meets a second preset adjustment condition.

In some embodiments, the operation that the control resource adjustment information is determined in response to the scheduling adjustment request from the target UE may include that:

a scheduling adjustment request sent by the target UE for requesting to adjust a position of control resources is received; and the control resource adjustment information for the target UE is determined according to the scheduling adjustment request.

In some embodiments, the scheduling adjustment request may include: an identity of control resources requested to be scheduled.

The operation that the control resource adjustment information for the target UE is determined according to the scheduling adjustment request may include that:

the control resource adjustment information for the target UE is determined according to the identity of the control resources requested to be scheduled.

In some embodiments, the operation that control resource adjustment information for a target UE is determined may include that:

a control resource range is adjusted based on a CORESET provided in the original scheduling for the target UE; and the control resource adjustment information is generated according to an adjustment result of the control resource range.

In some embodiments, in condition that the time-frequency range of the control resource is adjusted from large to small, the operation that a control resource range is adjusted may include that:

in condition that at least two CORESETs are provided for the original scheduling, one or more CORESETs are selected from the at least two CORESETs, and determined as a target CORESET; or in condition that at least one CORESET is provided for the original scheduling, a part of control resources are selected from the at least one CORESET, and determined as a target control resource region.

In some embodiments, the operation that the control resource range is adjusted may further include that:

a binding number of search REGs is specified for the target CORESET or the target control resource region.

In some embodiments, the operation that the control resource adjustment information is generated according to the adjustment result of the control resource range may include that:

the control resource adjustment information is generated according to a time-frequency position of the target CORESET, a time-frequency position of the target control resource region or the binding number of search REGs.

In some embodiments, the operation that transmission resources are allocated to the target UE according to the control resource adjustment information and the time-frequency resource range for the original scheduling may include that:

control information transmission resources are allocated to the target UE according to the control resource adjustment information; and data transmission resources are allocated to the target UE according to the control resource adjustment information and the time-frequency resource range for the original scheduling.

In some embodiments, the method may further include that:

adjustment scheduling for control resources is canceled and the original scheduling is resumed under a preset trigger condition.

In some embodiments, the control resource adjustment information may further include: a preset duration of the adjustment scheduling.

The operation that the adjustment scheduling for the control resources is canceled and the original scheduling is resumed under the preset trigger condition may include that:

the original scheduling is resumed in response to expiration of the preset duration.

According to a second aspect of the embodiments of the present disclosure, a method for adjusting information transmission is provided. The method may be applied to a UE. The method may include the following operations.

control resource adjustment information sent by a base station is received, the control resource adjustment information being information of control resources adjusted by the base station based on original scheduling;

according to the control resource adjustment information, DCI is monitored in a time-frequency range to which the adjusted control resources belong; and information transmission is performed according to the DCI by using transmission resources scheduled by the base station.

In some embodiments, before control resource adjustment information sent by a base station is received, the method may further include that:

a scheduling adjustment request is sent to the base station, the scheduling adjustment request being used for requesting the base station to adjust a time-frequency range of control resources.

In some embodiments, the scheduling adjustment request may include: an identity of the control resources requested to be scheduled.

The identity of the control resources requested to be scheduled may include: a center frequency of a time-frequency range to which the control resources belong, or a preset number of target CORESETs requested to be scheduled.

In some embodiments, the control resource adjustment information may include at least one of the following:

a time-frequency position of any one of one or more target CORESETs of all CORESETs in a BWP;

a time-frequency position of a part of control resource regions in any one of one or more CORESETs of all the CORESETs; or a binding number of search REGs for a target control resource.

In some embodiments, the operation that DCI is monitored in a time-frequency range to which adjusted control resources belong according to the control resource adjustment information may include that:

DCI for the UE is searched from a control resource region corresponding to the one or more target CORESETs; or DCI for the UE is searched from a part of control resource region in any one of the one or more CORESETs; or DCI for the UE is searched from a control resource region corresponding to any one of the target CORESET or the part of control resource region in any one of the one or more CORESETs according to the binding number of search REGs.

In some embodiments, the control resource adjustment information may further include: a preset duration of adjustment scheduling. The method may further include that:

in response to expiration of the preset duration, information transmission is performed according to a time-frequency range for the original scheduling.

According to a third aspect of the embodiments of the present disclosure, a base station is provided, which may include:

an adjustment information determination module, configured to determine control resource adjustment information for a target UE, the control resource adjustment information being information of control resources adjusted based on original scheduling;

a sending module, configured to send the control resource adjustment information to the target UE to enable the target UE to monitor DCI in a time-frequency range to which the adjusted control resources belong;

a resource allocation module, configured to allocate transmission resources to the target UE according to the control resource adjustment information and the time-frequency resource range for the original scheduling, a frequency range of the transmission resources at least including: a frequency range of the adjusted control resources; and a transmission module, configured to perform information transmission with the target UE through the transmission resources.

In some embodiments, the control resource adjustment information determined by the adjustment information determination module may include at least one of the following:

a time-frequency position of any one of one or more target CORESETs of all CORESETs in a BWP;

a time-frequency position of a part of control resource region in any one of one or more CORESETs of all the CORESETs; or a binding number of search REGs for a target control resource.

In some embodiments, the adjustment information determination module may include:

a first determination sub-module, configured to determine the control resource adjustment information according to an amount of information to be transmitted; or a second determination sub-module, configured to determine the control resource adjustment information in response to a scheduling adjustment request from the target UE.

In some embodiments, the first determination sub-module may include:

a first comparison unit, configured to compare a present amount of information to be transmitted by the base station on a BWP with a first preset threshold to obtain a comparison result, a time-frequency range of the BWP including a time-frequency range for the original scheduling; and a first determination unit, configured to determine the control resource adjustment information for the target UE in condition that the comparison result meets a first preset adjustment condition.

In some embodiments, the first determination sub-module may include:

an amount-of-information determination unit, configured to determine a present amount of information to be transmitted for the target UE;

a second comparison unit, configured to compare the present amount of information to be transmitted with a second preset threshold to obtain a comparison result; and a second determination unit, configured to determine the control resource adjustment information for the target UE in condition that the comparison result meets a second preset adjustment condition.

In some embodiments, the second determination sub-module may include:

a request receiving unit, configured to receive a scheduling adjustment request sent by the target UE for requesting to adjust a time-frequency position of control resources; and an information determination unit, configured to determine the control resource adjustment information for the target UE according to the scheduling adjustment request.

In some embodiments, the scheduling adjustment request may include: an identity of the control resources requested to be scheduled.

The information determination unit may be configured to determine the control resource adjustment information for the target UE according to the identity of the control resources rested to be scheduled.

In some embodiments, the adjustment information determination module may include:

an adjustment range determination sub-module, configured to adjust a control resource range based on a CORESET for the target UE provided in the original scheduling for the target UE; and an adjustment information determination sub-module, configured to generate the control resource adjustment information according to an adjustment result of the control resource range.

In some embodiments, the adjustment range determination sub-module may be configured to adjust the time-frequency range of the control resource from large to small, and may include:

a first range determination unit, configured to select, in condition that at least two CORESETs are provided for the original scheduling, one or more CORESETs from the at least two CORESETs, and determine the selected CORESET as a target CORESET; or a second range determination unit, configured to select, in condition that at least one CORESET is provided for the original scheduling, a part of control resources from the at least one CORESET, and determine the selected CORESET as a target control resource region.

In some embodiments, the adjustment range determination sub-module may further include:

a binding number determination unit, configured to specify a binding number of search REGs for the target CORESET or the target control resource region.

In some embodiments, the adjustment information determination sub-module may be configured to generate the control resource adjustment information according to a time-frequency position of the target CORESET, a time-frequency position of the target control resource region or the binding number of search REGs.

In some embodiments, the resource allocation module may include:

a control resource allocation sub-module, configured to allocate control information transmission resources to the target UE according to the control resource adjustment information; and a data resource allocation sub-module, configured to allocate data transmission resources to the target UE according to the control resource adjustment information and the time-frequency resource range for the original scheduling.

In some embodiments, the base station may further include:

a scheduling resuming module, configured to cancel adjustment scheduling for control resources and resume the original scheduling under a preset trigger condition.

In some embodiments, the control resource adjustment information determined by the adjustment information determination module may further include: a preset duration of the adjustment scheduling.

The scheduling resuming module may be configured to resume the original scheduling in response to expiration of the preset duration.

According to a fourth aspect of the embodiments of the present disclosure, a UE is provided, which may include:

an information receiving module, configured to receive control resource adjustment information sent by a base station, the control resource adjustment information being information of control resources adjusted by the base station based on original scheduling;

a monitoring module, configured to monitor, according to the control resource adjustment information, DCI in a time-frequency range to which the adjusted control resources belong; and a transmission module, configured to perform information transmission according to the DCI by using transmission resources scheduled by the base station.

In some embodiments, the UE may further include:

a request sending module, configured to send a scheduling adjustment request to the base station, the scheduling adjustment request being used for requesting the base station to adjust a time-frequency range of control resources.

In some embodiments, the scheduling adjustment request sent by the request sending module may include: an identity of the control resources requested to be scheduled.

The identity of the control resources requested to be scheduled may include: a center frequency of a time-frequency range to which the control resources belong, or a preset number of target CORESETs requested to be scheduled.

In some embodiments, the control resource adjustment information received by the information receiving module may include at least one of the following:

a time-frequency position of any one of one or more target CORESETs of all CORESETs in a BWP;

a time-frequency position of a part of control resource region in any one of one or more CORESETs of all the CORESETs; or a binding number of search REGs for a target control resource.

In some embodiments, the monitoring module may include:

a first monitoring sub-module, configured to search for DCI for the UE from a control resource region corresponding to any one of the one or more target CORESETs; or a second monitoring sub-module, configured to search for DCI for the UE from a part of control resource region in any one of the one or more CORESETs; or a third monitoring sub-module, configured to search for DCI for the UE from a control resource region corresponding to any one of the one or more target CORESETs or a part of control resource region in any one of the one or more CORESETs according to the binding number of search REGs.

In some embodiments, the control resource adjustment information received by the information receiving module may further include: a preset duration of adjustment scheduling. The UE may further include:

a scheduling resuming module, configured to perform, in response to expiration of the preset duration, information transmission according to a time-frequency range for the original scheduling.

According to a fifth aspect of the embodiments of the present disclosure, a non-transitory computer readable storage medium is provided, which may store computer instructions that, when executed by a processor, implements the any of the operations of the methods as described in the first aspect.

According to a sixth aspect of the embodiments of the present disclosure, a non-transitory computer readable storage medium is provided, which may store computer instructions that, when executed by a processor, implements any of the operations of the method as described in the second aspect.

According to a seventh aspect of the embodiments of the present disclosure, a base station is provided, which may include:

a processor; and a memory configured to store instructions executed by the processor, where the processor is configured to:

determine control resource adjustment information for a target UE, the control resource adjustment information being information of control resources adjusted based on original scheduling;

send the control resource adjustment information to the target UE to enable the target UE to monitor DCI in a time-frequency range to which the adjusted control resources belong;

allocate transmission resources to the target UE according to the control resource adjustment information and the time-frequency resource range for the original scheduling, a frequency range of the transmission resources at least including: a frequency range of the adjusted control resources; and perform information transmission with the target UE through the transmission resources.

According to an eighth aspect of the embodiments of the present disclosure, a UE is provided, which may include:

a processor; and a memory configured to store instructions executed by the processor, where the processor is configured to:

receive control resource adjustment information sent by a base station, the control resource adjustment information being information of control resources adjusted by the base station based on original scheduling;

monitor, according to the control resource adjustment information, DCI in a time-frequency range to which the adjusted control resources belong; and perform information transmission according to the DCI by using transmission resources scheduled by the base station.

The technical solutions provided by the embodiments of the present disclosure may include the following beneficial effects.

In the embodiments of the present disclosure, when a base station or a target UE needs to adjust a control resource range in the scheduling of the target UE due to changes in the traffic to be transmitted or energy saving requirements, the base station may adjust the control resource range scheduled at a next time based on original scheduling of the target UE at a previous time, to enable the target UE to monitor DCI used for the target UE within a time-frequency range to which newly scheduled control resources belong, so as to perform information transmission with the base station through transmission resources indicated by the DCI. Because part of the transmission scheduling information for the original scheduling, such as a time-frequency position of a CORESET, may be used as prior information in new scheduling, there is no need for reconfiguration of the target UE. Therefore, the scheduling adjustment time may be effectively shortened, and control signaling overheads are reduced, thereby saving wireless transmission resources and improving scheduling adjustment efficiency. Through the above scheduling adjustment, the target UE may quickly and freely switch between broadband and narrowband devices, thereby improving the user experience of the target UE in a 5G network, and increasing the intelligence of 5G network transmission.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present invention and, together with the description, serve to explain the principles of the present invention.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of apparatuses and methods consistent with aspects related to the present disclosure as recited in the appended claims.

The execution subject involved in the present disclosure includes: a base station and a UE in a 5G network, where the base station may be a base station, a sub-base station, or the like provided with a large-scale antenna array. The UE may be a user terminal, a user node, a mobile terminal, or a tablet. In a specific implementation process, the base station and the UE are independent of each other, and are in association with each other to implement the technical solution provided by the present disclosure together.

The present disclosure provides a method for adjusting information transmission, which is applied to converting from a scheduling mode to another scheduling mode in a process of scheduling of a UE by a base station. The above-mentioned scheduling and conversion is that the bases station adjusts scheduling of a target UE at a next time based on scheduling for a target UE at a previous time, namely original scheduling. Part of the transmission scheduling information in the original scheduling, such as a time-frequency position of a CORESET (Control Resource Set), may be used as prior information in a new scheduling, and there is no need for instructing reconfiguration for the target UE.

The implementation of the method is to adjust a time-frequency resource range used to carry control information within a time-frequency range of one BWP, so that the target UE monitors DCI (Downlink Control Information) for the target UE from the adjusted control resources. In the present disclosure, one or more CORESETs are configured in original scheduling of the target UE by the base station, and each CORESET may carry DCI of the target UE. The DCI of the target UE includes: scheduling control information for the target UE, reference signal configuration, and the like.

It is to be illustrated that the original time-frequency resource range for the target UE scheduled by the base station may be a BWP or part of time-frequency resources of a BWP.

Figure 1:
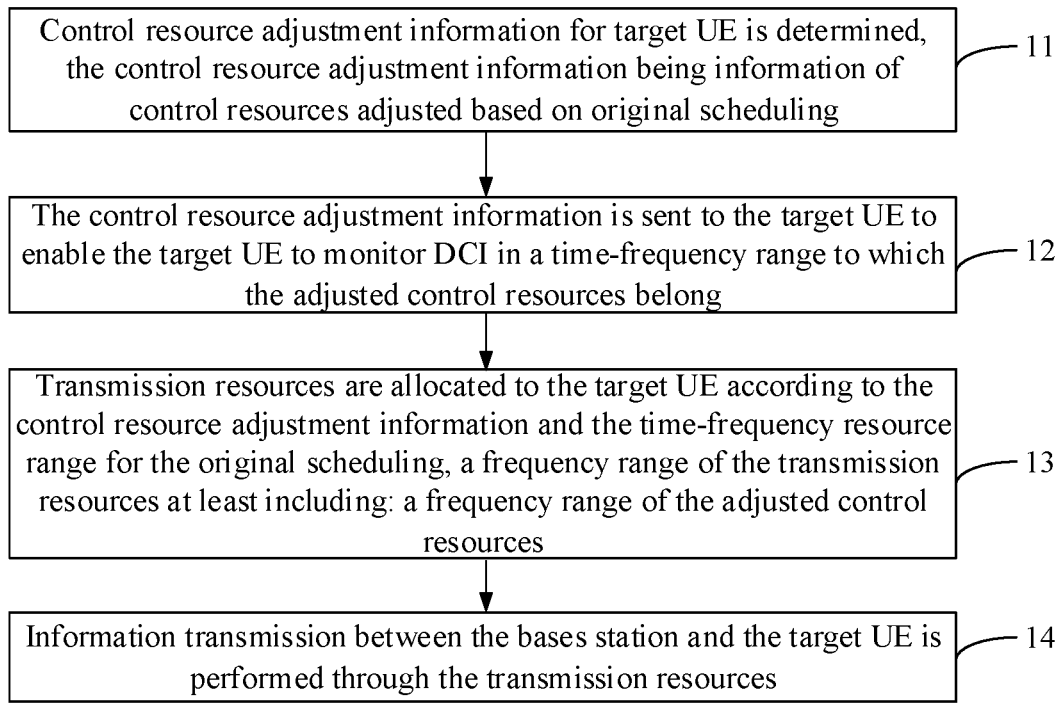
FIG. 1 is a flowchart illustrating a method for adjusting information transmission, according to some embodiments of the present disclosure.

FIG. 1 is a flowchart illustrating a method for adjusting information transmission according to some embodiments. The method is applied to a base station, and may include the following operations.

In operation 11, control resource adjustment information for a target UE is determined, the control resource adjustment information being information of control resources which is adjusted based on original scheduling.

In the present disclosure, the above control resource adjustment information is used to instruct that the target UE monitors DCI for the target UE within a new control resource range. The adjusted control resource range may be reduced or expanded relative to a time-frequency range of control resources in the original scheduling.

In the present disclosure, the timing at which the base station is triggered to determine control resource adjustment information may include the following two situations.

In a first case, the base station actively adjusts the control resource range for the target UE under preset trigger conditions to determine control resource adjustment information.

In this case, the base station may determine whether to adjust the control resource range for the target UE according to a present amount of information to be transmitted in the BWP or an amount of information to be transmitted for the target UE.

In an embodiment of the present disclosure, for the above first case, the base station may determine whether to adjust the control resource range for the target UE according to the transmission capacity of a BWP, the current amount of information to be transmitted, and the device type of the target UE.

Figure 2:
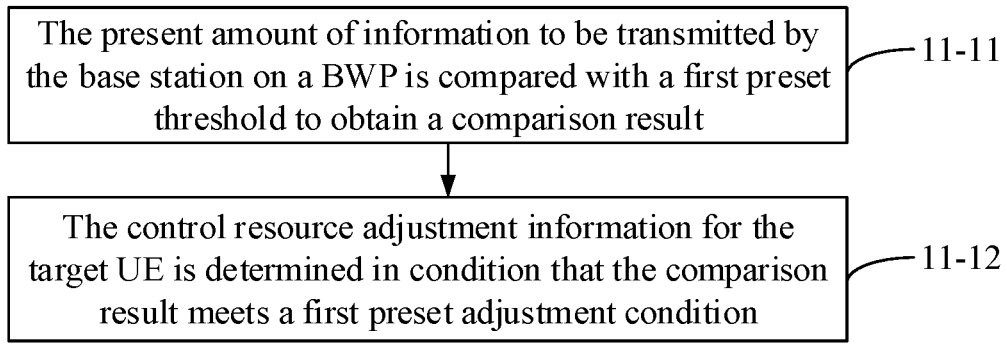
FIG. 2 is a flowchart illustrating another method for adjusting information transmission, according to some embodiments of the present disclosure.

FIG. 2 is a flowchart illustrating another method for adjusting information transmission according to some embodiments. Operation 11 may include the following actions.

In action 11-11, the present amount of information to be transmitted by the base station on a BWP is compared with a first preset threshold to obtain a comparison result.

The time-frequency range of the BWP includes a time-frequency range for the original scheduling of the target UE. It is to be noted that the including operation herein means that the time-frequency range for the original scheduling of the target UE belongs to a part of or completely coincides with the time-frequency range of the BWP.

It is assumed that the base station schedules multiple UEs in the BWP, such as three UEs, including the target UE. The base station may calculate present amount of information to be transmitted for three UEs, and obtain an amount of information to be transmitted by the base station on the BWP, assumed to be W1.

It is assumed that the maximum amount of information that can be carried by the BWP at the same time, namely the information capacity, is W0. In the embodiment of the present disclosure, a first preset threshold may be set based on the BWP information capacity W0. According to different adjustment situations, the first preset threshold may be an upper threshold, such as 80% of W0, or a lower threshold, such as 30% of W0. The amount W1 of information to be transmitted is compared with the first preset threshold to obtain a comparison result.

In action 11-12, the control resource adjustment information for the target UE is determined if the comparison result meets a first preset adjustment condition.

In the present disclosure, the first preset adjustment condition may include a restriction on an amount of information to be transmitted and a restriction on a UE type or a current service type.

In some embodiments, the first preset adjustment condition may be that: when the amount of information to be transmitted for the BWP is greater than or equal to the upper threshold, the scheduling range of a non-delay sensitive device is preferentially reduced. The above non-delay sensitive device includes: a UE that is not sensitive to delay, or a UE that currently transmits non-delay sensitive service data such as massive machine type communication (mMTC) service data.

As the above example, if W1 is greater than or equal to 80% of W0 and the target UE (such as UE1) belongs to the above non-delay sensitive devices, or the target UE has the lowest delay-sensitive priority among the three UEs, the range of control resources allocated to UE1 may be reduced to determine control resource adjustment information of UE1.

Conversely, the first preset adjustment condition may also be that: when the amount of information to be transmitted on the BWP is less than or equal to the lower threshold, the scheduling range of a delay sensitive device is preferentially expanded. The above delay sensitive device includes: a UE that is sensitive to delay, or a UE that currently transmits delay sensitive service data such as ultra-reliable low latency communication (URLLC) service data.

As the above example, if W1 is less than or equal to 30% of W0 and the target UE (such as UE1) belongs to the above delay sensitive devices, or the target UE has the highest delay-sensitive priority among the three UEs, the range of control resources allocated to UE1 may be expanded, but does not exceed the time-frequency range of the BWP, so as to determine control resource adjustment information of UE1.

In another embodiment of the present disclosure, for the above first case, the base station may also determine whether to adjust the control resource range for the target UE according to the amount of information to be transmitted for the target UE.

Figure 3:
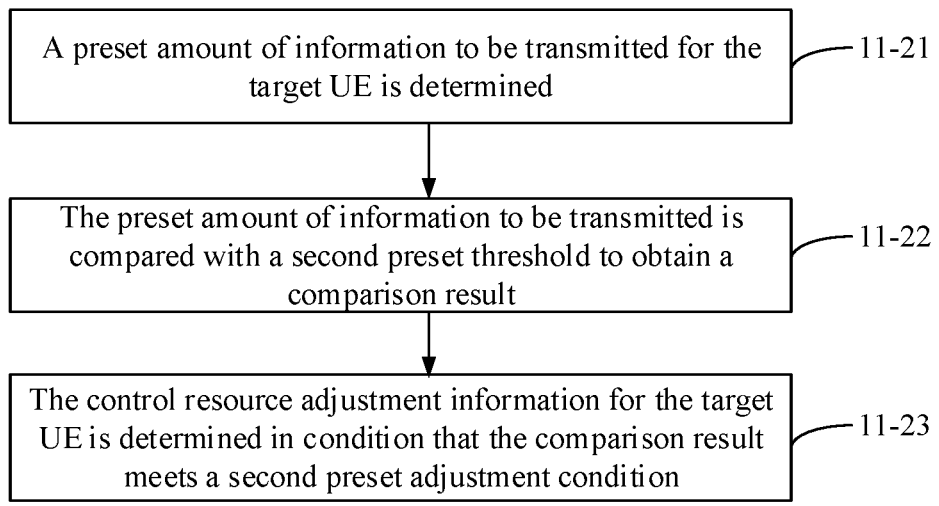
FIG. 3 is a flowchart illustrating another method for adjusting information transmission according to some embodiments of the present disclosure.

FIG. 3 is a flowchart illustrating another method for adjusting information transmission according to some embodiments. Operation 11 may include the following actions.

In action 11-21, a present amount of information to be transmitted for the target UE is determined.

In the embodiment of the present disclosure, the base station may determine the amount of uplink buffered data of the target UE according to a buffer status report (BSR) sent by the target UE and the amount of downlink buffered data for the target UE determined by the base station, and calculate the present amount of information to be transmitted for the target UE, that is, the sum of the amount of uplink buffered data and the amount of downlink buffered data.

In action 11-22, the present amount of information to be transmitted is compared with a second preset threshold to obtain a comparison result.

This action is similar to the action 11-11 in the embodiment illustrated in FIG. 2, except that the second preset threshold in the action is an upper threshold or a lower threshold for the target UE that is preset in the base station.

The second preset threshold may be a threshold set by the base station according to information such as a device identifier, a device type, and a service type of the target UE.

In an embodiment, a preset threshold list may be preset in the base station, and the preset threshold list includes a correspondence between a UE type and a second preset threshold. The base station may query the preset threshold list according to the device type of the target UE, and determine a second preset threshold corresponding to the target UE. The second preset threshold is used as a basis for judging whether to adjust the control resource range for the target UE. Then, the base station compares the present amount of information to be transmitted for the target UE with the second preset threshold to obtain a comparison result.

In step 11-23, the control resource adjustment information for the target UE is determined if the comparison result meets a second preset adjustment condition.

Similarly, in an embodiment of the present disclosure, the above second preset adjustment condition may be that: the present amount of information to be transmitted for the target UE is greater than or equal to a preset upper threshold. If this condition is met, the control resource range for the target UE is reduced, so that the control resource adjustment information is determined.

Conversely, in another embodiment of the present disclosure, the above second preset adjustment condition can be that: the present amount of information to be transmitted for the target UE is less than or equal to a preset lower threshold. If this condition is met, the control resource range of the target UE is expanded but does not exceed the time-frequency range of the BWP, so that the control resource adjustment information is determined.

In the second case, the base station passively adjusts the control resource range for the target UE in response to a scheduling adjustment request from the target UE, to determine control resource adjustment information.

Figure 4:
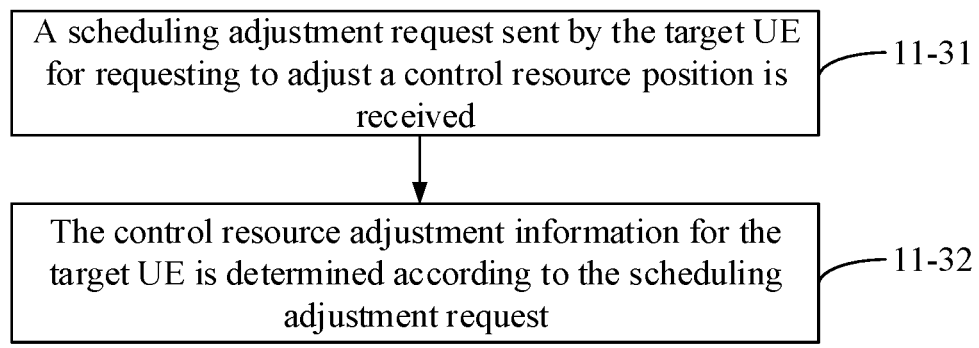
FIG. 4 is a flowchart illustrating another method for adjusting information transmission according to some embodiments of the present disclosure.

FIG. 4 is a flowchart illustrating another method for adjusting information transmission according to some embodiments. Operation 11 may include the following actions.

In action 11-31, a scheduling adjustment request sent by the target UE for requesting to adjust a control resource position is received by the base station.

The scheduling adjustment request may include only 1-bit information. For example, according to a preset protocol, when the above 1-bit is set to 1, it indicates that adjustment of scheduling is requested.

In another embodiment of the present disclosure, the scheduling adjustment request may further include: an identity of the requested control resource to be adjusted.

In action 11-32, the control resource adjustment information for the target UE is determined according to the scheduling adjustment request.

In an embodiment of the present disclosure, if the scheduling adjustment request includes only scheduling adjustment indication information, such as the 1-bit information that is set to 1, the base station may determine control resource adjustment information for the target UE according to a preset rule. For example, upon reception of the scheduling adjustment request, it is determined whether to adjust a control resource range for the target UE according to the manner illustrated in FIG. 3.

In another embodiment of the present disclosure, in condition that the scheduling adjustment request includes an identity of the requested control resource to be scheduled, the base station may determine control resource adjustment information for the target UE according to information such as the identity of the control resource requested by the target UE, for example, the number of the target CORESET or a corresponding center frequency and bandwidth or the like. In the embodiment of the present disclosure, the base station may quickly determine an adjustment resource range according to the identity of the control resource requested by the target UE, thereby reducing the time for calculating the control resource adjustment range.

Figure 5:
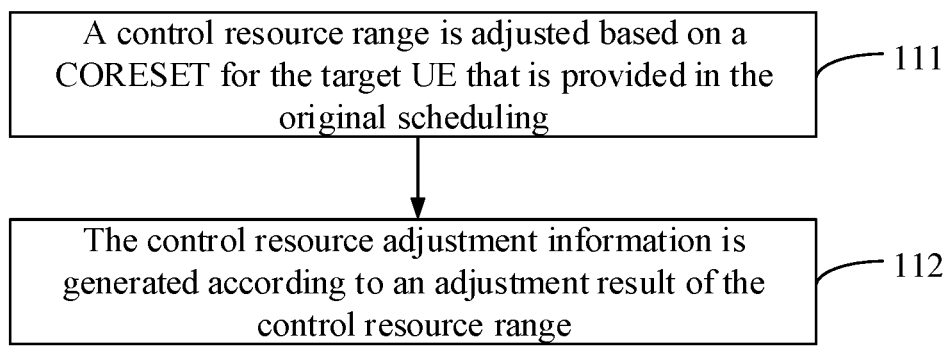
FIG. 5 is a flowchart illustrating another method for adjusting information transmission according to some embodiments of the present disclosure.

On the basis of any of the above embodiments, regarding how to determine the control resource adjustment information for the target UE, as can be seen from a flowchart illustrating another method for adjusting information transmission according to some embodiments in FIG. 5, operation 11 may include the following actions.

In action 111, a control resource range is adjusted based on a CORESET provided in the original scheduling for the target UE.

In the present disclosure, one or more CORESETs are provided in the original scheduling for the target UE by the base station, and the base station may specify, within a BWP time-frequency range to which the original scheduling belongs, a target CORESET to which new control resources belong or a part of regions of the target CORESET according to different control resource adjustment modes. The control resource adjustment modes include: adjustment from large to small, and adjustment from small to large.

Figure 6A:
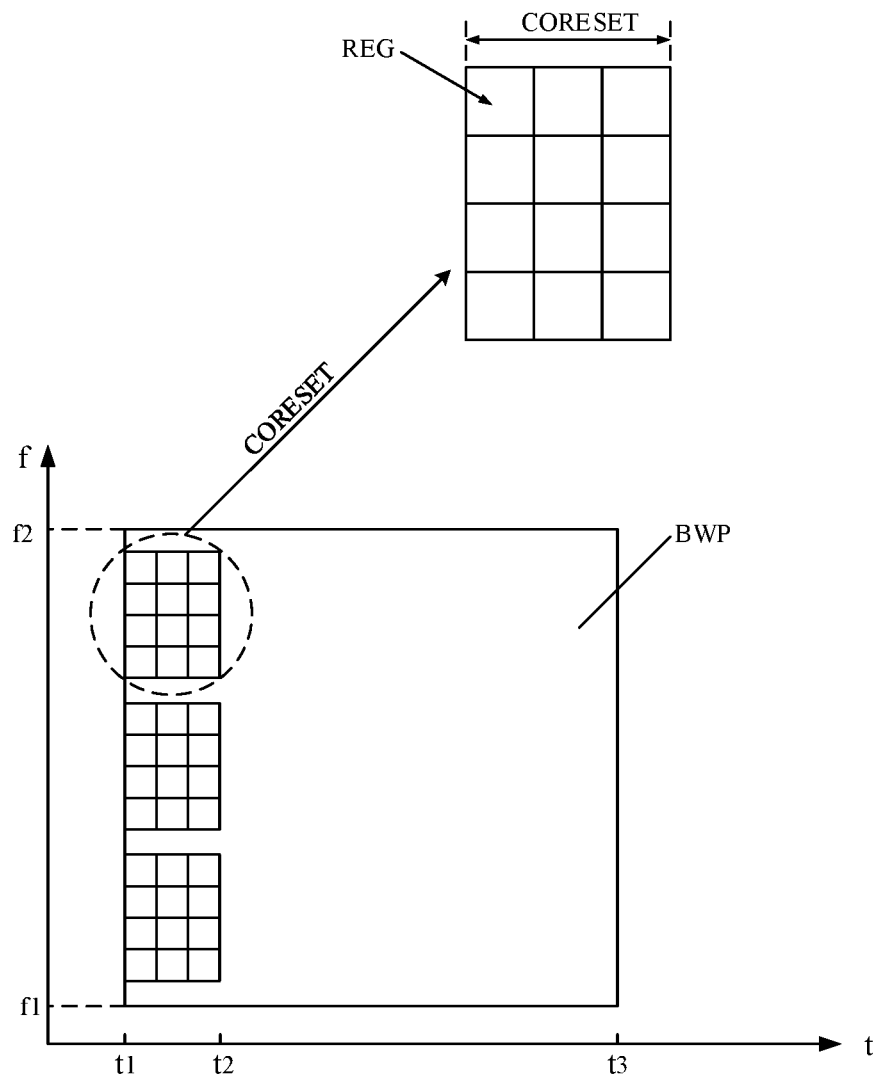
FIG. 6A is a schematic diagram illustrating original scheduling, according to some embodiments of the present disclosure.

FIG. 6A is a schematic diagram illustrating an original scheduling time-frequency range according to some embodiments. It is assumed that the original scheduling for the target UE by the base station is within a BWP, where a time domain range of the BWP is: t1~t3, and a frequency domain range is: f1~f2. The time-frequency region corresponding to the frequency domain range: f1-f2 and the time domain range: t1-t2 represents a control resource region of the BWP, which includes three CORESETs, identified from top to bottom as: C1, C2, and C3. Referring to the enlarged schematic diagram of C1 illustrated in the upper part of FIG. 6A, one CORESET is composed of several REGs, and each CORESET is composed of 12 REGs in FIG. 6A.

The situation where the control resource range is adjusted from large to small is applicable to the situation where the traffic of the target UE is reduced or the target UE needs energy saving, reduction of the control resource range of the target UE may be implemented by using at least one of the following manners. Detailed descriptions thereof will be described below from changes among FIG. 6A, FIG. 6B, FIG. 6C and FIG. 6D.

In the first manner, if at least two CORESETs are provided in the original scheduling, one or more CORESETs are selected therefrom and determined as a target CORESET.

Figure 6B:
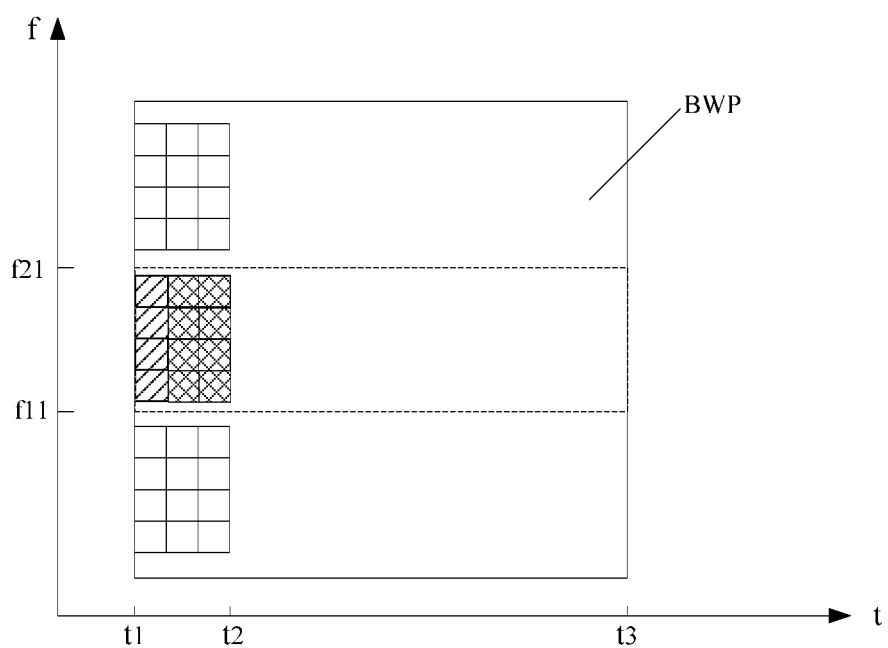
FIG. 6B is a schematic diagram illustrating a scenario for adjusting information transmission according to some embodiments of the present disclosure.

FIG. 6B is a schematic diagram illustrating an application scenario for adjusting information transmission according to some embodiments. It is assumed that the time-frequency range for the original scheduling of the target UE is as illustrated in FIG. 6A, during adjustment of the control resources, one or two CORESETs may be selected therefrom to carry DCI for subsequent scheduling. For example, the middle CORESET is selected as a target CORESET, as illustrated in FIG. 6B.

In the second manner, if at least one CORESET is provided in the original scheduling, a part of control resources are selected from the at least one CORESET and determined as a target control resource region.

Figure 6C:
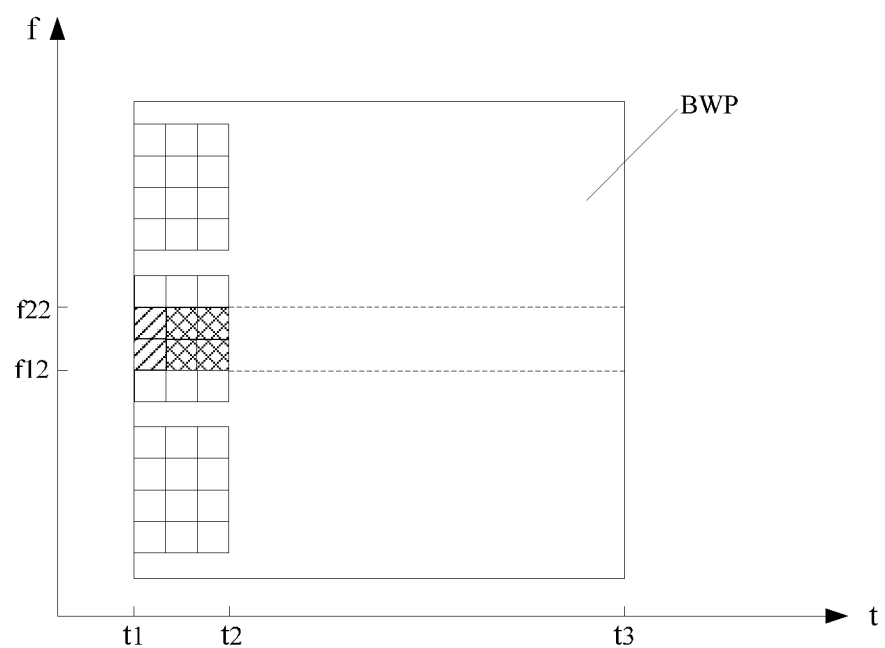
FIG. 6C is a schematic diagram illustrating another scenario for adjusting information transmission according to some embodiments of the present disclosure.

FIG. 6C is a schematic diagram illustrating another application scenario for adjusting information transmission according to some embodiments. It is still assumed that the time-frequency resource range of the original scheduling of the target UE includes three CORESETs, as illustrated in FIG. 6A.

During adjustment of the control resource range, a part of control resources of at least one CORESET of the three CORESETs may be selected as a target control resource region for carrying DCI for subsequent scheduling. As illustrated in FIG. 6C, a part of the resources in the middle CORESET is selected as the target control resource region. The time-frequency position information of the target control resource region is expressed as: frequency domain (f11~f22) and time domain (t1~t2).

In another embodiment of the present disclosure, the situation where a part of control resources of multiple CORESETs are selected as the target control resource region may be applied to the following application scenarios: the target UE is provided with multiple 5G radio frequency transceiver modules, each of which has a different central working frequency. In the original scheduling, each radio frequency transceiver module searches from its respective CORESET for DCI that belongs to its own working frequency range. In order for power saving or reduction of service transmission amount of each module, a part of region of any CORESET may also be selected as the target control resource region in subsequent scheduling, so that each radio frequency transceiver module of the target UE searches for DCI for the target UE from the reduced control resource region.

Figure 6D:
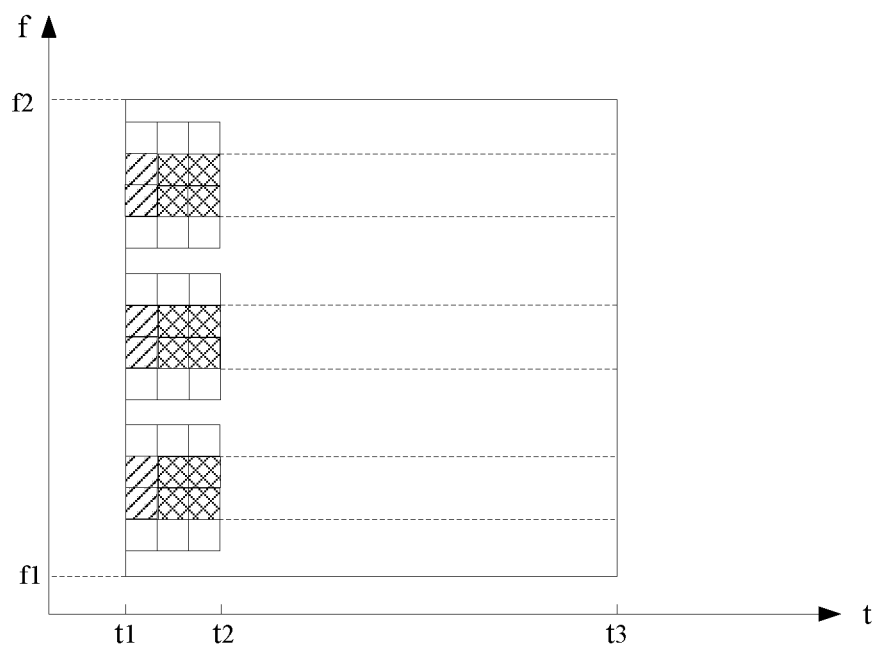
FIG. 6D is a schematic diagram illustrating another scenario for adjusting information transmission according to some embodiments of the present disclosure.

In some embodiments, as illustrated in FIG. 6D, the base station selects a part of control resources of each CORESET in the subsequent scheduling, as the target control resource region of each radio frequency transceiver module of the target UE. FIG. 6D illustrates a case where a part of control resource regions of the same size are selected in each CORESET, which should not be construed as a limitation on the application embodiment of the present disclosure. In other embodiments of the present disclosure, the sizes of the selected part of control resource regions may also be different.

In the third manner, on the basis of any one of the above embodiments, the adjustment control resource information may further include: a binding number of REGs specified for searching for a target CORESET or a target control resource region.

According to related knowledge, a basic element for carrying DCI is a control channel element (CCE), and each CCE contains a preset number of REGs. In the related art, the target UE, when performing blind detection, generally does not know which the binding number of search REGs is used to search for DCI for the target UE in the control resource region. Therefore, all binding numbers of search REGs (such as 1, 2, 4, and 8) that may be used in the control resource region will be used for searching separately, resulting in low blind detection efficiency. The above binding number of search REGs refers to the binding number of REGs used by the target UE to perform blind searching in the control resources.

In the embodiment of the present disclosure, the base station may specify for the target UE the bindings number of REG used by the target UE to search for DCI for the target UE in the target CORESET or the target control resource region, namely the binding number of search REGs, such as 4 or 8, so as to reduce the number of blind detections for the target CORESET or the target control resource region by the target UE, thereby improving the blind detection efficiency of the target UE and reducing the calculation amount of the target UE.

Conversely, for the case of increasing the control resource range from small to large, it belongs to the reverse process of the above adjustment. For example, the base station may specify multiple CORESETs for the target UE in the BWP and determine the specified CORESETs as the adjusted target CORESETs. The above target CORESET includes: a CORESET in the time-frequency resources for the original scheduling, such as the second CORESET in FIG. 6B. Alternatively, the base station specifies resources of a part of region of one or more CORESET for the target UE, and determines the specified region as the adjusted target control resource region. The above target control region resources include: resources of a part of region of CORESET used in the original scheduling, such as a time-frequency region composed of the frequency domain (f12~f22) and the time domain (t1~t2) in FIG. 6C.

In action 112, the control resource adjustment information is generated according to an adjustment result of the control resource range.

In the embodiment of the present disclosure, the control resource adjustment information may be generated according to a time-frequency position of the target CORESET, a time-frequency position of the target control resource region and the binding number of the search REGs.

According to different adjustment modes for the control resource range, the obtained adjustment results are different, and the correspondingly generated control resource adjustment information is also different.

For example, corresponding to the first manner, the generated control resource adjustment information may include: an identity of the target CORESET or a time-frequency position of the target CORESET. The identity of the target CORESET may be a serial number of CORESET such as C2. The time-frequency position of the target CORESET may be: a specific time-frequency range of the target CORESET, such as a frequency domain (f11~f21) and a time domain (t1~t2) in FIG. 6B.

In an embodiment, according to the protocol, the time domain position of the CORESET is preset in a basic information transmission time interval (TTI), and thus the identity or time-frequency position of the target CORESET may be expressed as: a center frequency of the target CORESET.

For the combination of the first manner and the third manner, the above control resource adjustment information may further include: a specified binding number of search REGs.

For the second manner, the generated control resource adjustment information may include: a time-frequency position of the target control resource region. The time-frequency position of the target control resource region may be a specific time-frequency range, such as the frequency domain (f12~f22) and the time domain (t1~t2) in FIG. 6C, or a center frequency and bandwidth of the target control resource region.

For the combination of the second manner and the third manner, the above control resource adjustment information may further include: a specified search REG binding number.

In operation 12, the control resource adjustment information is sent by the base station to the target UE to enable the target UE to monitor DCI in a time-frequency range to which the adjusted control resources belong.

The base station sends the above control resource adjustment information to the target UE, and instructs the target UE to search for DCI for the target UE in the target CORESET or the target control resource region, or quickly search for the DCI for the target UE according to the specified search REG binding number.

In the present disclosure, the base station may send the above control resource adjustment information to the target UE through broadcast signaling, upper layer signaling, or physical downlink control channel (PDCCH) signaling of a physical layer. The upper layer signaling may be radio resource control (RRC) signaling or a medium access control (MAC) control element (CE).

In operation 13, transmission resources are allocated to the target UE according to the control resource adjustment information and the time-frequency resource range of the original scheduling, a frequency range of the transmission resources at least including: a frequency range of the adjusted control resources.

In the present disclosure, after determining the control resource adjustment information, the base station allocates transmission resources used at the next moment to the target UE according to the control resource adjustment information, where the transmission resources include: control information transmission resources and data transmission resources.

Figure 7:
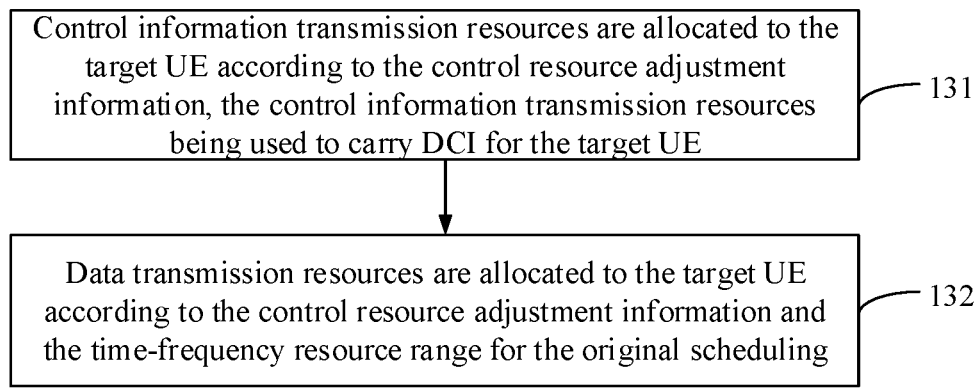
FIG. 7 is a flowchart illustrating another method for adjusting information transmission according to some embodiments of the present disclosure.

FIG. 7 is a flowchart illustrating another method for adjusting information transmission according to some embodiments. Operation 13 may include the following actions.

In action 131, control information transmission resources are allocated to the target UE according to the control resource adjustment information, the control information transmission resources being used to carry DCI for the target UE.

That is, the base station allocates time-frequency resources to the target UE according to the time-frequency range of the target CORESET or the target control resource region. For example, the base station may allocate the time-frequency region resources corresponding to the frequency domain (f12~f22) and the time domain (t1~t2) in FIG. 6C as control information transmission resources to the target UE.

In action 132, data transmission resources are allocated to the target UE according to the control resource adjustment information and the time-frequency resource range for the original scheduling.

The above data transmission resources are used by the target UE for uplink information transmission and downlink data transmission. The uplink information transmission includes: sending uplink data and uplink control information to the base station. The uplink control information may include: a reported measurement result of a reference signal (i.e., a channel quality indicator (CQI)), and hybrid automatic repeat request (HARD) feedback information for downlink data transmission.

In the embodiment of the present disclosure, the allocation of data transmission resources by the base station to the target UE may include the following two cases.

In the first case, data transmission resources are allocated to the target UE according to the time-frequency resource range in the original scheduling.

That is, the downlink control information obtained by the target UE indicates that the target UE may perform data transmission within the time-frequency resource range used for data transmission in the original scheduling. Taking FIG. 6A as an example, the original scheduling includes three CORESETs, and the adjusted target CORESET is: the second CORESET. Then the base station may still allocate the time-frequency region: frequency domain (f1~f2) and time domain (t2~t3) as data transmission resources to the target UE. In the embodiment of the present disclosure, one CORESET may be used to control resources beyond its frequency range.

In this case, compared to the original scheduling, the time-frequency range of the control resource is reduced, so that the target UE may reduce the search range when searching for its own control information. Therefore, the blind detection range and calculated amount of searching for and parsing DCI by the target UE may be effectively reduced.

In the second case, data transmission resources are allocated to the target UE according to the frequency range of the target control resource in the control resource adjustment information.

As illustrated in FIG. 6B and FIG. 6D, the base station allocates data transmission resources to the target UE within the frequency range corresponding to the target control resource. Referring again to FIG. 6B, it is assumed that the adjusted target CORESET is: the second CORESET. Then the base station allocates the time-frequency region: frequency domain (f11~f21) and time domain (t2~t3) as data transmission resources to the target UE. Similarly, in FIG. 6C, the base station may allocate the time-frequency region: frequency domain (f12~f22) and time domain (t2~t3) as data transmission resources to the target UE. In the embodiment of the present disclosure, one CORESET may control resource scheduling within its frequency range.

In this case, not only the blind detection range and calculated amount of the target UE can be reduced, but also the target UE can be converted from a broadband device to a narrowband device when the traffic of the target UE is reduced, thereby saving transmission resources, and reducing the energy consumption of the target UE.

In operation 14, information transmission with the target UE is performed by the base station through the transmission resources.

The base station may carry control information for the target UE such as scheduling control information, measurement signal configuration information, and other control information required for subsequent uplink and downlink transmission and signal measurement into the above-mentioned control information transmission resource, and issue it to the target UE.

In another embodiment of the present disclosure, the control information for the target UE may also be loaded into the control information transmission resource according to the specified search REG binding number.

According to the related art, the DCI of the base station and the target UE may include information in different formats. For example, the corresponding format of UL grant information is: format 0; the corresponding format of DL assignment information is: format 1; and the corresponding format of a power control command is: format 3, and so on.

If a CCE is formed using a unified binding number of REGs, DCI in some formats may need to be carried by multiple CCEs, and thus the UE is required to perform multiple blind detections in accordance with the above unified binding number of REGs to parse complete information of a certain format.

In the present disclosure, in order to reduce the number of blind detections in which the target UE searches for DCI in a certain format, different binding numbers of search REGs may be used to search for DCI information in different formats.

Figure 6E:
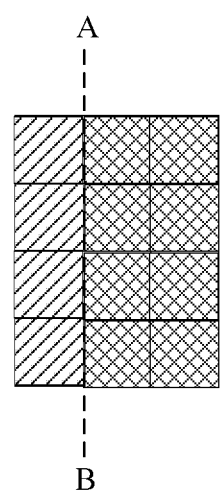
FIG. 6E is a schematic diagram illustrating another scenario for adjusting information transmission according to some embodiments of the present disclosure.

As illustrated in FIG. 6E, as an enlarged schematic diagram of the target CORESET in FIG. 6B, the CORESET includes two CCEs. Bounded by a dividing line AB in the figure, the four REGs on the left are bound as the first CCE, and the eight REGs on the right are bound as the second CCE. The first CCE may carry DCI in one format with a number of REG bindings of 4. The second CCE may carry DCI in another format with a number of REG bindings of 8.

That is, during generation of the CORESET, control information transmission resources may also be carried according to different REG binding numbers for DCI information of different formats. Correspondingly, the base station in the present disclosure may instruct the target UE to use different search REG binding numbers (such as 4 and 8) to quickly search for DCI in different formats required.

Correspondingly, if the base station needs to send data to the target UE, downlink data is transmitted through the downlink data transmission resources allocated by the base station to the target UE.

It can be seen that according to the method for adjusting information transmission provided by the present disclosure, when a base station or a target UE needs to adjust a control resource range in the scheduling of the target UE due to changes in the traffic to be transmitted or energy saving requirements, the base station may adjust the control resource range scheduled at a later time based on original scheduling of the target UE at a previous time, so that the target UE monitors DCI for the target UE within a time-frequency range to which newly scheduled control resources belong, so as to perform information transmission with the base station through a transmission resource indicated by the DCI. Because part of the transmission scheduling information in the original scheduling, such as a time-frequency position of a CORESET, may be used as prior information in a new scheduling without reconfiguration for the target UE. Therefore, the scheduling adjustment time may be effectively shortened, and control signaling overheads are reduced, thereby saving wireless transmission resources and improving scheduling adjustment efficiency. Through the above scheduling adjustment, the target UE may quickly and freely switch between broadband and narrowband devices, thereby improving the user experience of the target UE in a 5G network, and increasing the intelligence of 5G network transmission.

Figure 8:
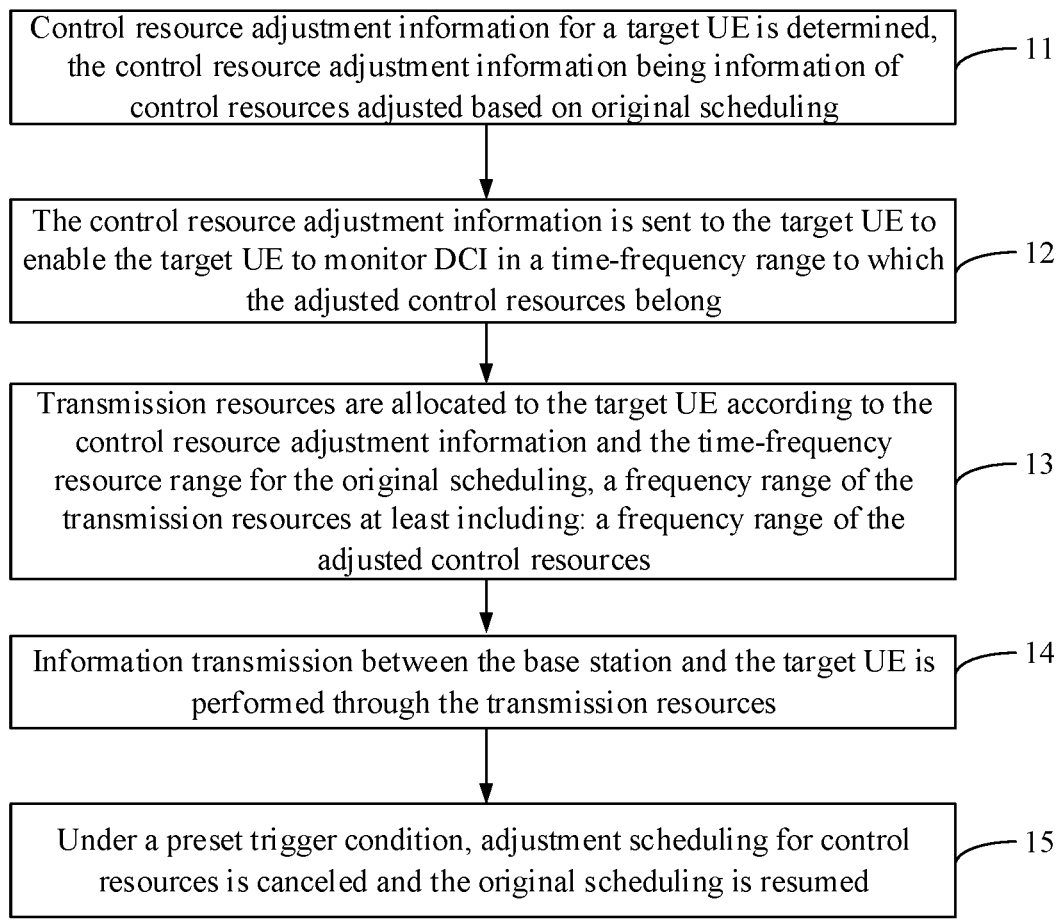
FIG. 8 is a flowchart illustrating another method for adjusting information transmission, according to some embodiments of the present disclosure.

Based on any of the above embodiments, the present disclosure can also resume the original scheduling under a preset trigger condition. FIG. 8 is a flowchart illustrating another method for adjusting information transmission according to some embodiments. On the basis of the embodiment illustrated in FIG. 1, after operation 14, the method may include the following operations.

In operation 15, adjustment scheduling for control resources is canceled and the original scheduling is resumed under a preset trigger condition.

In an embodiment of the present disclosure, the base station can determine to resume the original scheduling actively or according to the second scheduling adjustment request received from the UE, which is equivalent to performing the adjustment information transmission process again in the foregoing manner.

In another embodiment of the present disclosure, the control resource adjustment information may further include: a preset duration of the adjustment scheduling, so that a timer is synchronously maintained at the base station and the target UE side.

Operation 15 may include that: the original scheduling is resumed in response to expiration of the preset duration.

The preset duration may be time information estimated by the base station according to the traffic to be transmitted, such as 10 seconds. When the above duration expires, the base station and the target UE may be triggered to automatically resume the original scheduling, which avoids that the base station is required to re-determine the control resource adjustment information and then adjusts scheduling again when the subsequent traffic is resumed, so that signaling overheads and transmission resources can be effectively saved, and the scheduling conversion delay is shortened.

Figure 9:
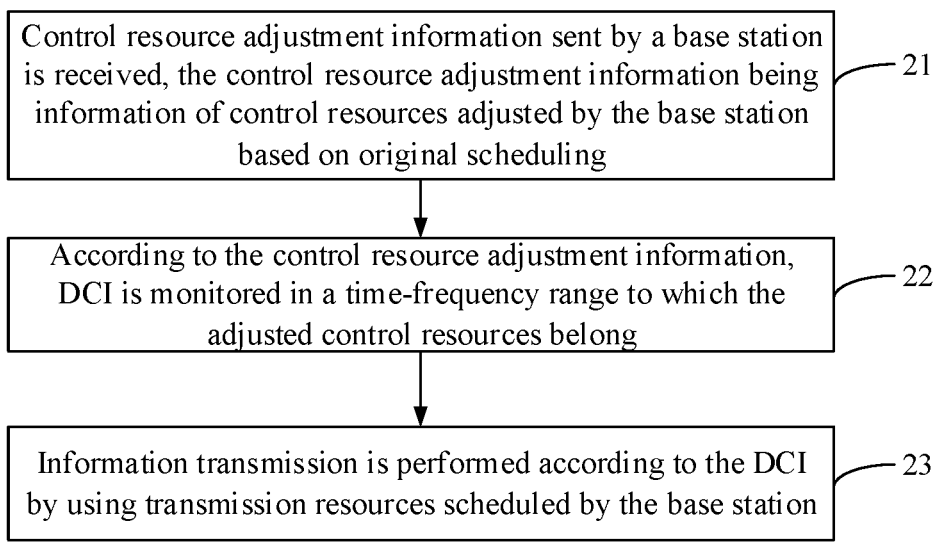
FIG. 9 is a flowchart illustrating a method for adjusting information transmission according to some embodiments of the present disclosure.

Correspondingly, the present disclosure also provides another method for adjusting information transmission, applied to a target UE. FIG. 9 is a flowchart illustrating a method for adjusting information transmission according to some embodiments. The method may include the following operations.

In operation 21, control resource adjustment information sent by a base station is received, the control resource adjustment information being information of control resources adjusted by the base station based on original scheduling.

Corresponding to operation 12, the control resource adjustment information is used for instructing the UE to monitor DCI in a time-frequency range to which the adjusted control resources belong.

In operation 22, according to the control resource adjustment information, DCI is monitored in a time-frequency range to which the adjusted control resources belong.

Corresponding to different information contained in the control resource adjustment information, this operation may include the following three implementation manners.

In the first implementation manner, DCI for the target UE is searched by the target UE from a control resource region corresponding to any one of one or more target CORESETs according to a time-frequency position of the one or more target CORESETs included in the control resource adjustment information. As illustrated in FIG. 6B, the target CORESET, that is the second CORESET, is searched by the target UE for the DCI used for the target UE.

In the second implementation manner, the DCI for the target UE is searched by the target UE from a control resource region corresponding to a part of regions of any one of one or more CORESETs according to a time-frequency position of one or more target control resource regions included in the control resource adjustment information. As illustrated in FIG. 6C, the DCI for the target UE is searched in the time-frequency range (f12~f22, t1~t2).

The control resource adjustment information further includes: the binding number of search REGs specified for a target control resource.

When the UE searches for DCI for the UE in the target control resource region according to any of the foregoing implementation manners, the search REG binding number specified by the base station may be used to perform blind detection in the target CORESET or the target control resource region, which can effectively reduce the number of blind detections.

In operation 23, information transmission is performed according to the DCI by using transmission resources scheduled by the base station.

The DCI issued by the base station to the UE at least includes: scheduling control information and reference signal configuration information, which are used to inform the target UE of the time-frequency distribution of uplink resources, downlink resources and reference signals.

The UE receives downlink data according to the above DCI by using the data transmission resources allocated by the base station, and sends uplink data and uplink control information.

Figure 10:
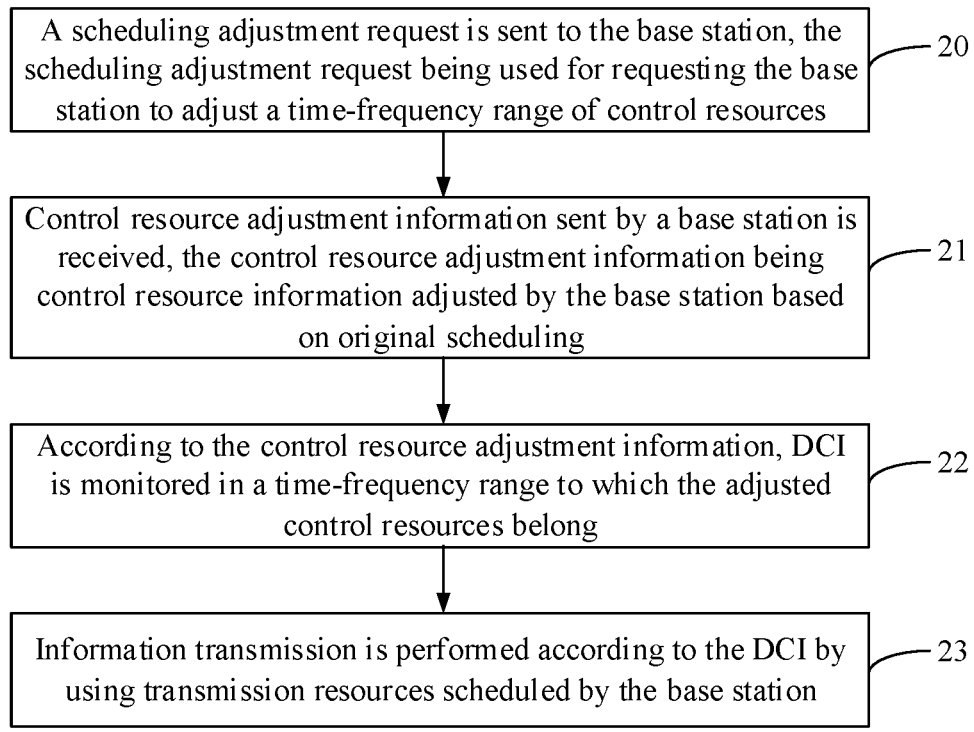
FIG. 10 is a flowchart illustrating another method for adjusting information transmission according to some embodiments of the present disclosure.

FIG. 10 is a flowchart illustrating another method for adjusting information transmission according to some embodiments. On the basis of the embodiment illustrated in FIG. 9, before operation 21, the method may include the following operations.

In operation 20, a scheduling adjustment request is sent by the UE to the base station, the scheduling adjustment request being used for requesting the base station to adjust a time-frequency range of control resources.

The operation 20 corresponds to action 11-31, so that the base station adjusts the time-frequency resource range to which the control resource belongs based on the original scheduling.

In another embodiment of the present disclosure, the scheduling adjustment request may further include: an identity of the requested control resource to be scheduled, for example, a preset number or a specific time-frequency position of the requested CORESET to be scheduled, or a time-frequency position of a part of control resource region in the CORESET. The time-frequency position may be a specific time-frequency range, or a center frequency and a corresponding bandwidth. The embodiments of the present disclosure are applicable to an application scenario in which the target UE requests the base station to adjust scheduling.

Figure 11:
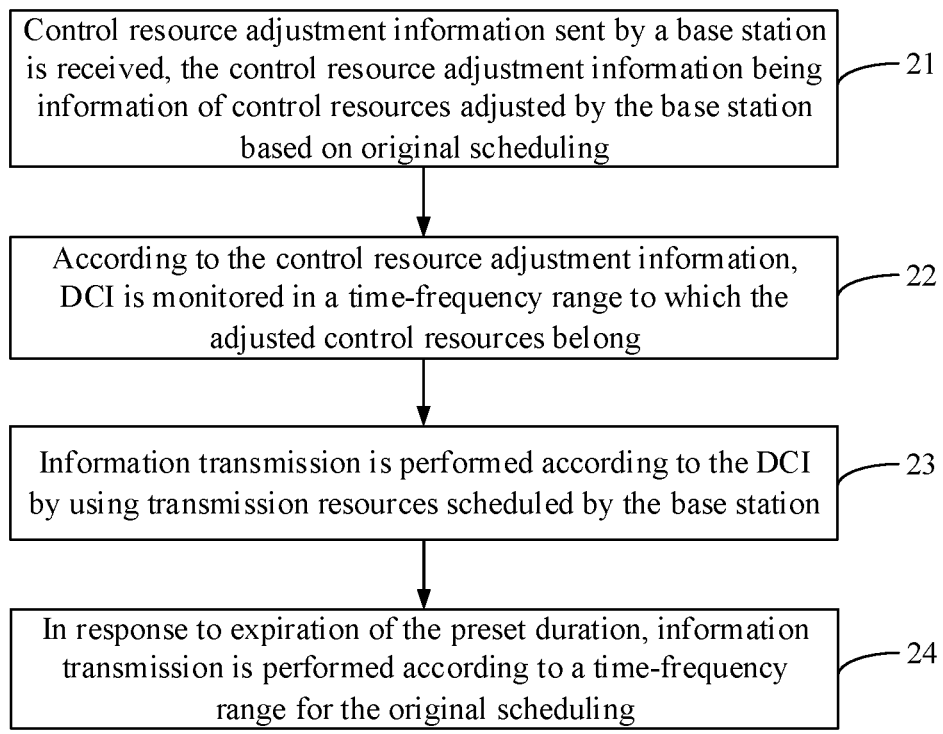
FIG. 11 is a flowchart illustrating another method for adjusting information transmission according to some embodiments of the present disclosure.

In another embodiment of the present disclosure, the target UE may also transmit information according to the original scheduling under a preset trigger condition. FIG. 11 is a flowchart illustrating another method for adjusting information transmission according to some embodiments. If the control resource adjustment information acquired in operation 21 further includes a preset duration of the scheduling adjustment, on the basis of the embodiment illustrated in FIG. 9, the method may further include the following operations.

In operation 24, after expiration of the preset duration, information transmission is performed according to a time-frequency range for the original scheduling.

Corresponding to the mode for automatically canceling scheduling adjustment at the base station side, the target UE and the base station may synchronously maintain a timer according to the preset duration of the scheduling adjustment, and the counting duration of the timer is the preset duration, such as 10 s. When time counting is ended, the base station and the target UE resume the original scheduling at the same time. Then the target UE may automatically transmit information according to the original scheduling, without the need for the base station to re-determine and send control resource adjustment information, thereby effectively saving scheduling conversion time, and improving the flexibility and intelligence of scheduling adjustment.

For simplicity of description, each of the above method embodiments is expressed as a combination of a series of operations, but those skilled in the art should know that the present disclosure is not limited to the described operation sequence because some operations may be executed in other sequences or at the same time according to the present disclosure.

Secondly, those skilled in the art should also know that all the embodiments described in the specification are optional embodiments and involved operations and modules are not always required by the present disclosure.

Corresponding to the above application function implementation method embodiments, the present disclosure also provides embodiments of an application function implementation apparatus and a corresponding terminal.

Figure 12:
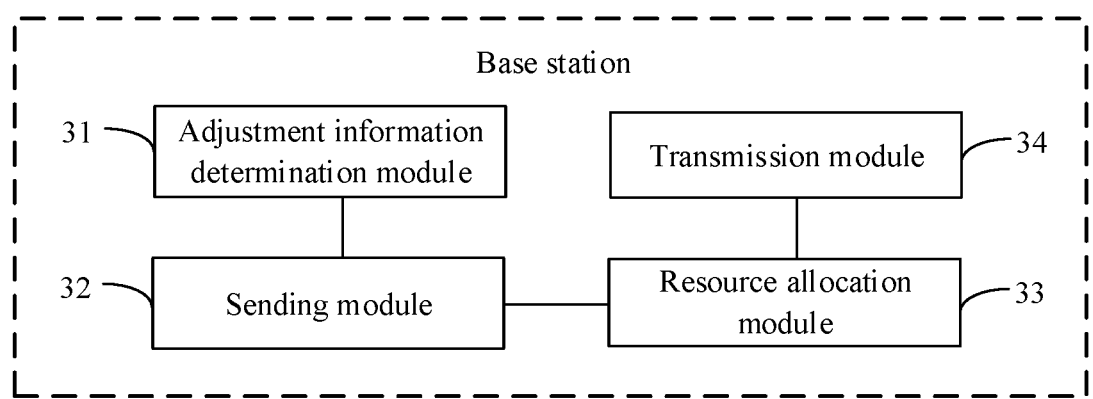
FIG. 12 is a block diagram illustrating a base station according to some embodiments of the present disclosure.

FIG. 12 is a block diagram illustrating a base station according to an embodiment. The apparatus may include: an adjustment information determination module 31, a sending module 32, a resource allocation module 33, and a transmission module 34.

The adjustment information determination module 31 is configured to determine control resource adjustment information for a target UE, the control resource adjustment information being information of control resources adjusted based on original scheduling.

In a base station embodiment of the present disclosure, the control resource adjustment information determined by the adjustment information determination module 31 may include at least one of the following:

a time-frequency position of any one of one or more target CORESETs of all CORESETs in a BWP;

a time-frequency position of a part of control resource region in any one of one or more CORESETs of all the CORESETs; and a binding number of search REGs for a target control resource.

The sending module 32 is configured to send the control resource adjustment information to the target UE to enable the target UE to monitor DCI in a time-frequency range to which the adjusted control resources belong.

The resource allocation module 33 is configured to allocate transmission resources to the target UE according to the control resource adjustment information and the time-frequency resource range for the original scheduling, a frequency range of the transmission resources including at least: a frequency range of the adjusted control resources.

The transmission module 34 is configured to perform information transmission with the target UE through the transmission resources.

Figure 13:
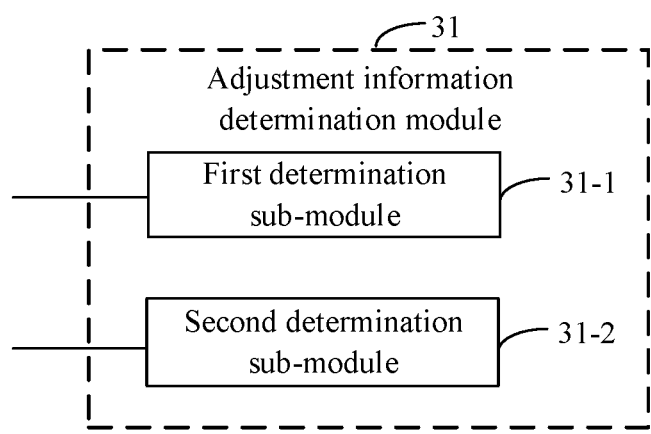
FIG. 13 is a block diagram illustrating another base station according to some embodiments of the present disclosure.

FIG. 13 is a block diagram illustrating another base station, according to an embodiment. On the basis of the embodiment of the base station illustrated in FIG. 12, the adjustment information determination module 31 may include: a first determination sub-module 31-1 or a second determination sub-module 31-2.

The first determination sub-module 31-1 is configured to determine the control resource adjustment information according to the amount of information to be transmitted.

The second determination sub-module 31-2 is configured to determine the control resource adjustment information in response to a scheduling adjustment request from the target UE.

Figure 14:
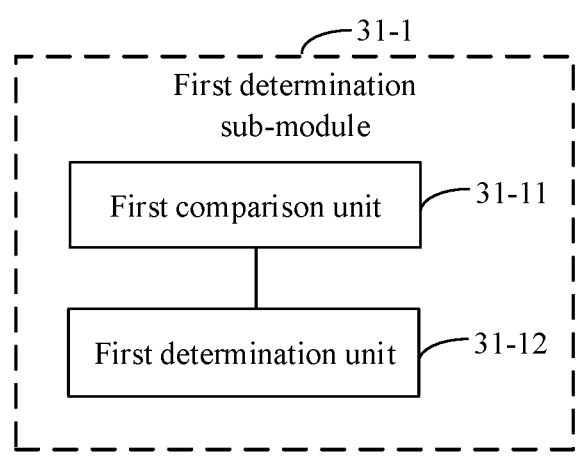
FIG. 14 is a block diagram illustrating another base station according to some embodiments of the present disclosure.

FIG. 14 is a block diagram illustrating another base station according to an embodiment. On the basis of the embodiment of the base station illustrated in FIG. 13, the first determination sub-module 31-1 may include: a first comparison unit 31-11 and a first determination unit 31-12.

The first comparison unit 31-11 is configured to compare a present amount of information to be transmitted by the base station on a BWP with a first preset threshold to obtain a comparison result, a time-frequency range of the BWP including a time-frequency range for the original scheduling.

The first determination unit 31-12 is configured to determine the control resource adjustment information for the target UE if the comparison result meets a first preset adjustment condition.

Figure 15:
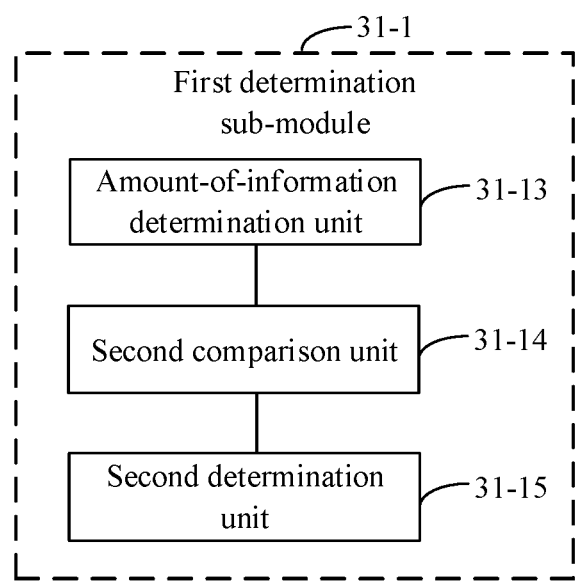
FIG. 15 is a block diagram illustrating another base station according to some embodiments of the present disclosure.

FIG. 15 is a block diagram illustrating another base station according to an embodiment. On the basis of the embodiment of the base station illustrated in FIG. 13, the first determination sub-module 31-1 may include: an amount-of-information determination unit 31-13, a second comparison unit 31-14 and a second comparison unit 31-15.

The amount-of-information determination unit 31-13 is configured to determine a present amount of information to be transmitted for the target UE.

The second comparison unit 31-14 is configured to compare the present amount of information to be transmitted with a second preset threshold to obtain a comparison result.

The second determination unit 31-15 is configured to determine the control resource adjustment information for the target UE if the comparison result meets a second preset adjustment condition.

Figure 16:
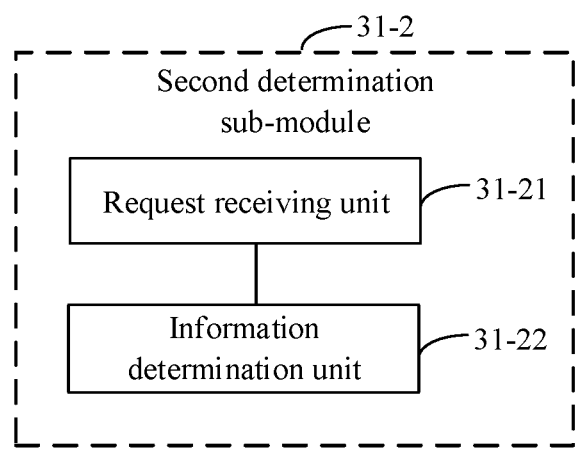
FIG. 16 is a block diagram illustrating another base station according to some embodiments of the present disclosure.

FIG. 16 is a block diagram illustrating another base station according to an embodiment. On the basis of the embodiment of the base station illustrated in FIG. 13, the second determination sub-module 31-2 may include: a request receiving unit 31-21 and an information determination unit 31-22.

The request receiving unit 31-21 is configured to receive a scheduling adjustment request sent by the target UE for requesting to adjust a control resource position.

The information determination unit 31-22 is configured to determine the control resource adjustment information for the target UE according to the scheduling adjustment request.

In another embodiment of the present disclosure, the scheduling adjustment request received by the request receiving unit 31-21 may further include: an identity of control resources requested to be scheduled.

The information determination unit 31-22 may be configured to determine the control resource adjustment information for the target UE according to the identity of the control resources requested to be scheduled.

Figure 17:
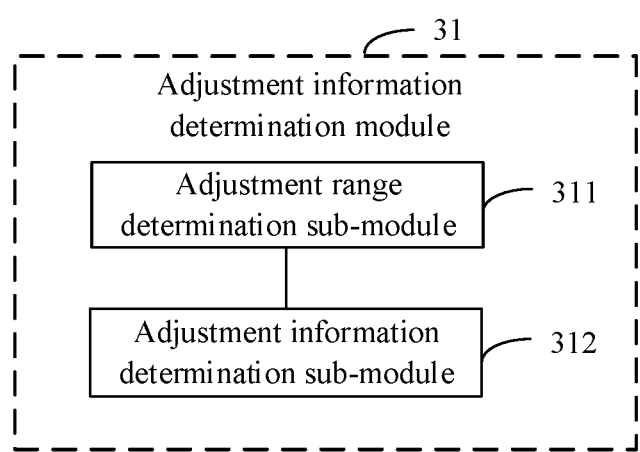
FIG. 17 is a block diagram illustrating another base station according to some embodiments of the present disclosure.

FIG. 17 is a block diagram illustrating another base station according to an embodiment. On the basis of the embodiment of the base station illustrated in FIG. 12, the adjustment information determination module 31 may include: an adjustment range determination sub-module 311 and an adjustment information determination sub-module 312.

The adjustment range determination sub-module 311 is configured to adjust a control resource range based on one or more CORESETs, provided in the original scheduling, for the target UE.

The adjustment information determination sub-module 312 is configured to generate the control resource adjustment information according to an adjustment result of the control resource range.

Figure 18:
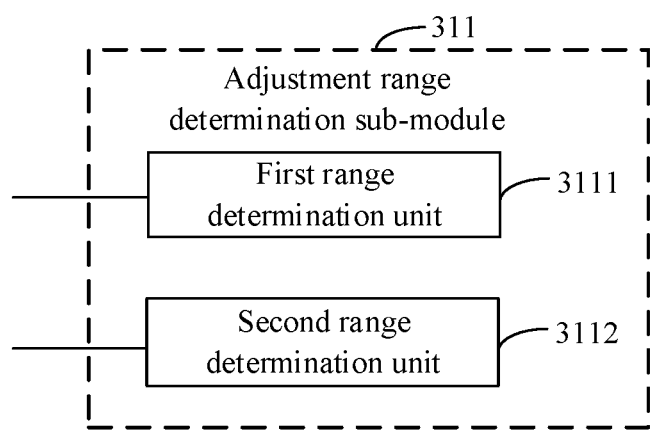
FIG. 18 is a block diagram illustrating another base station according to some embodiments of the present disclosure.

In another embodiment of the present disclosure, the adjustment range determination sub-module 311 is configured to adjust the time-frequency range of the control resources from large to small. FIG. 18 is a block diagram illustrating another base station according to an embodiment. On the basis of the embodiment of the base station illustrated in FIG. 17, the adjustment range determination sub-module 311 may include any one of the following units: a first range determination unit 3111 and a second range determination unit 3112.

The first range determination unit 3111 is configured to select, if at least two CORESETs are provided in the original scheduling, one or more CORESETs from the at least two CORESETs, and determine the selected CORESET as a target CORESET.

The second range determination unit 3112 is configured to select, if at least one CORESET is provided for the original scheduling, a part of control resources from the at least one CORESET, and determine the selected CORESET as a target control resource region.

Figure 19:
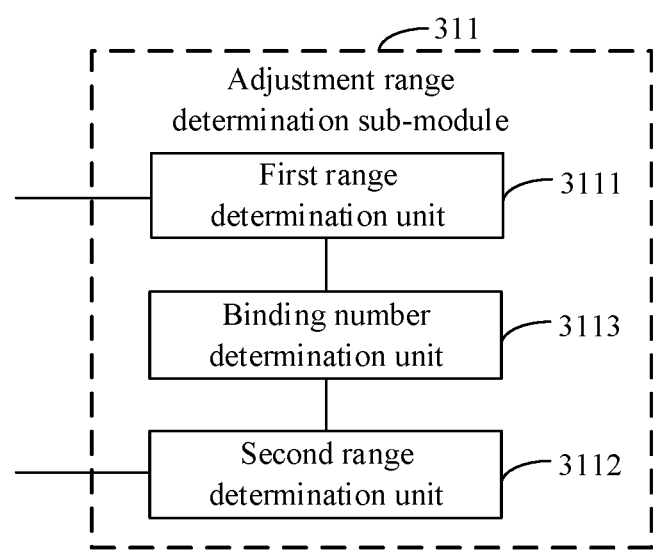
FIG. 19 is a block diagram illustrating another base station according to some embodiments of the present disclosure.

FIG. 19 is a block diagram illustrating another base station according to an embodiment. On the basis of the embodiment of the base station illustrated in FIG. 18, the adjustment range determination sub-module 311 may further include: a binding number determination unit 3113.

The binding number determination unit 3113 is configured to specify a binding number of search REG for the target CORESET or the target control resource region.

Correspondingly, on the basis of the base station embodiment illustrated in FIG. 18 and FIG. 19, the adjustment information determination sub-module 312 may be configured to generate the control resource adjustment information according to a time-frequency position of the target CORESET or a time-frequency position of the target control resource region and the binding number of search control REGs.

Figure 20:
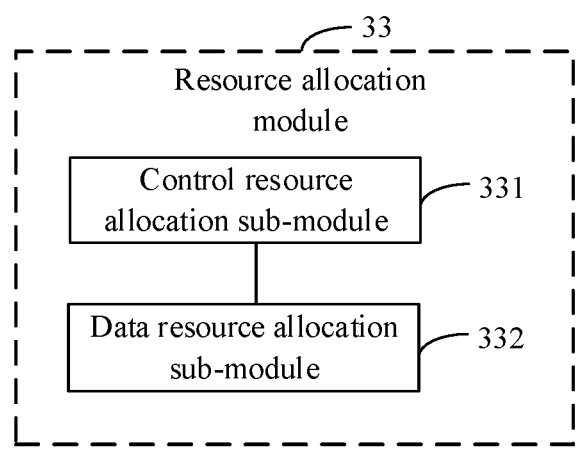
FIG. 20 is a block diagram illustrating another base station according to some embodiments of the present disclosure.

FIG. 20 is a block diagram illustrating another base station according to an embodiment. On the basis of the embodiment of the base station illustrated in FIG. 12, the resource allocation module 33 may include: a control resource allocation sub-module 331 and a data resource allocation sub-module 332.

The control resource allocation sub-module 331 is configured to allocate control information transmission resources to the target UE according to the control resource adjustment information.

The data resource allocation sub-module 332 is configured to allocate data transmission resources to the target UE according to the control resource adjustment information and the time-frequency resource range for the original scheduling.

Figure 21:
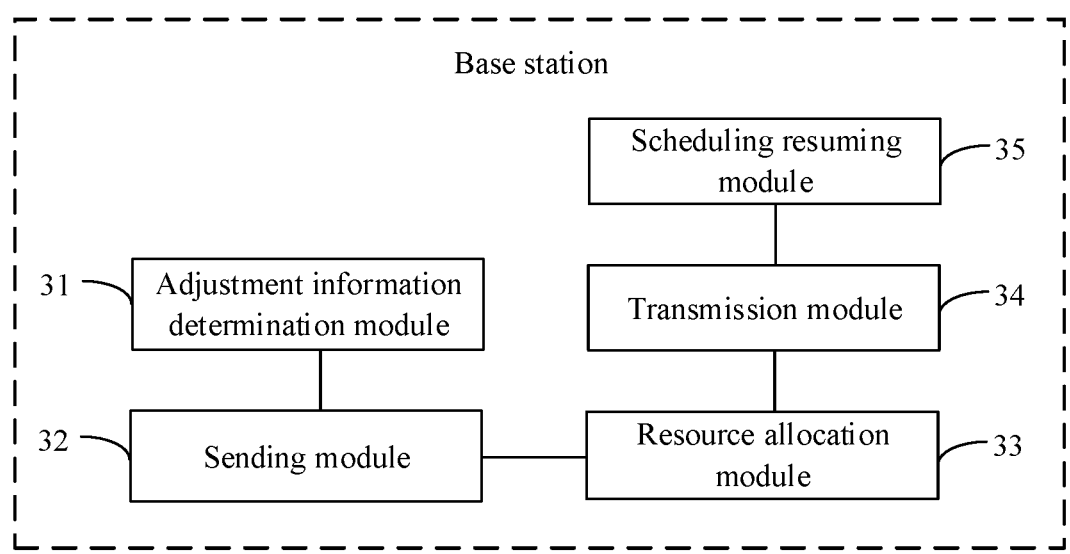
FIG. 21 is a block diagram illustrating another base station according to some embodiments of the present disclosure.

FIG. 21 is a block diagram illustrating another base station, according to an embodiment. On the basis of the embodiment of the base station illustrated in FIG. 12, the base station may further include: a scheduling resuming module 35.

The scheduling resuming module 35 is configured to cancel adjustment scheduling for control resources and resume the original scheduling under a preset trigger condition.

In another embodiment of the present disclosure, the control resource adjustment information determined by the adjustment information determination module 31 may further include: a preset duration of the adjustment scheduling.

Correspondingly, the scheduling resuming module 35 may be configured to resume the original scheduling in response to expiration of the preset duration.

Figure 22:
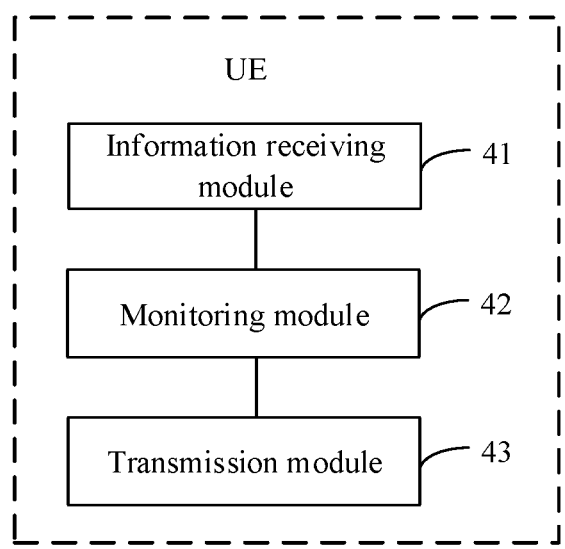
FIG. 22 is a block diagram illustrating a UE, according to some embodiments of the present disclosure.

Correspondingly, the present disclosure also provides a UE. FIG. 22 is a block diagram illustrating a UE according to an embodiment. The UE may include: an information receiving module 41, a monitoring module 42 and a transmission module 43.

The information receiving module 41 is configured to receive control resource adjustment information sent by a base station, the control resource adjustment information being information of control resources adjusted by the base station based on original scheduling.

The monitoring module 42 is configured to monitor, according to the control resource adjustment information, DCI in a time-frequency range to which the adjusted control resources belong.

The transmission module 43 is configured to perform information transmission according to the DCI by using transmission resources scheduled by the base station.

Figure 23:
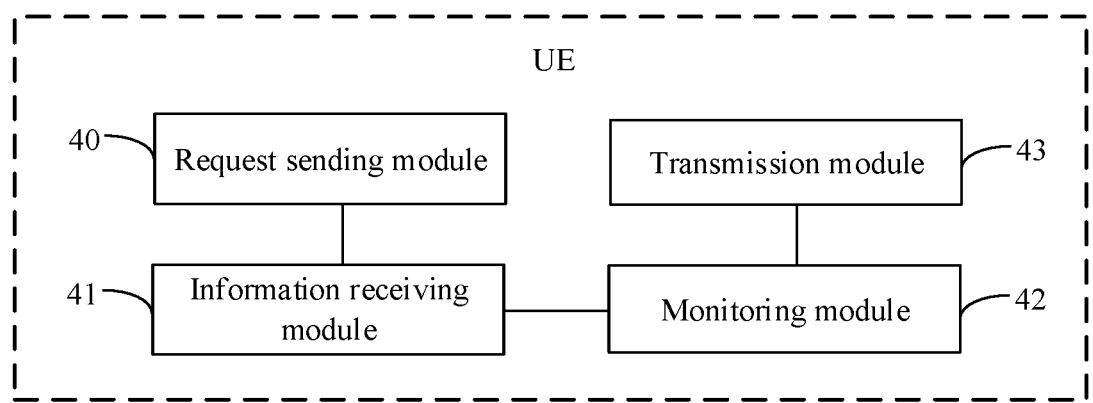
FIG. 23 is a block diagram illustrating another UE according to some embodiments of the present disclosure.

FIG. 23 is a block diagram illustrating another base station according to an embodiment. On the basis of the embodiment illustrated in FIG. 22, the UE may further include: a request sending module 40.

The request sending module 40 is configured to send a scheduling adjustment request to the base station, the scheduling adjustment request being used for requesting the base station to adjust a time-frequency range of control resources.

In another embodiment of the present disclosure, the scheduling adjustment request sent by the request sending module 40 may further include: an identity of control resources requested to be scheduled. The identity of the control resources requested to be scheduled may include: a center frequency of a time-frequency range to which the control resources belong, or a preset number of target CORESETs requested to be scheduled.

In another embodiment of the present disclosure, the control resource adjustment information received by the information receiving module 41 may include at least one of the following:

a time-frequency position of any one of one or more target CORESETs of all CORESETs in a BWP;

a time-frequency position of a part of control resource region in any one of one or more CORESETs of all the CORESETs; and a binding number of search control REG for a target control resource.

Figure 24:
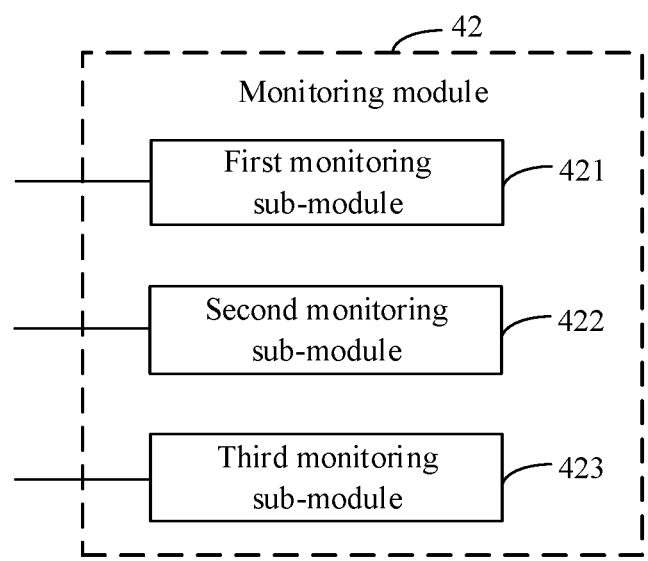
FIG. 24 is a block diagram illustrating another UE according to some embodiments of the present disclosure.

FIG. 24 is a block diagram illustrating another base station according to an embodiment. On the basis of the embodiment illustrated in FIG. 22, the monitoring module 42 may include any one of the following sub-modules: a first monitoring sub-module 421, a second monitoring sub-module 422 and a third monitoring sub-module 423.

The first monitoring sub-module 421 is configured to search for DCI for the UE from a control resource region corresponding to any one of the one or more target CORESETs.

The second monitoring sub-module 422 is configured to search for DCI for the UE from a part of control resource region in any one of the one or more CORESETs.

The third monitoring sub-module 423 is configured to search for DCI for the UE from a control resource region corresponding to the target CORESET or a part of control resource region of the CORESET according to the binding number of search REGs.

Figure 25:
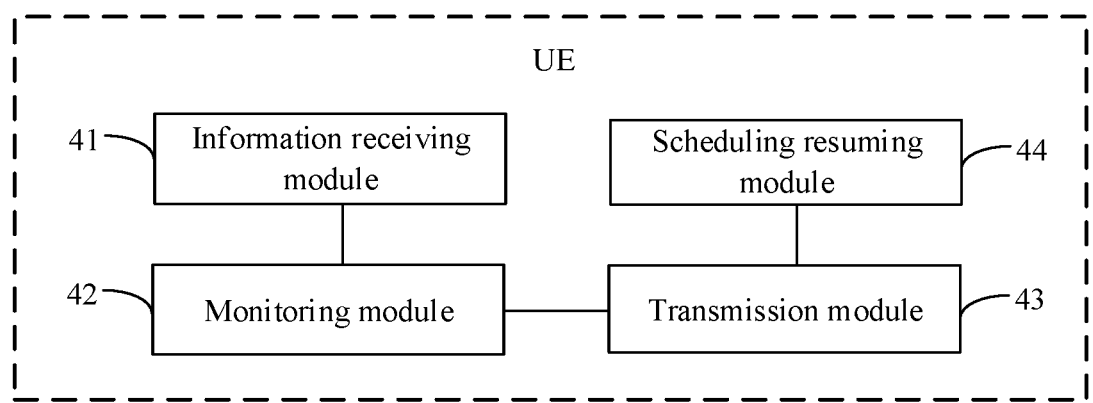
FIG. 25 is a block diagram illustrating another UE according to some embodiments of the present disclosure.

In an embodiment of the present disclosure, the control resource adjustment information received by the information receiving module 41 may further include: a preset duration of the adjustment scheduling. FIG. 25 is a block diagram illustrating another base station according to an embodiment. On the basis of the embodiment illustrated in FIG. 22, the UE may further include: a scheduling resuming module 44.

The scheduling resuming module 44 is configured to perform, in response to expiration of the preset duration, information transmission according to a time-frequency range for the original scheduling.

The apparatus embodiments substantially correspond to the method embodiments, and thus related parts refer to part of descriptions of the method embodiments. The apparatus embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

Correspondingly, an aspect provides a base station, which includes:

a processor; and a memory configured to store instructions executed by the processor, where the processor is configured to:

determine control resource adjustment information for a target UE, the control resource adjustment information being information of control resources adjusted based on original scheduling;

send the control resource adjustment information to the target UE to enable the target UE to monitor DCI in a time-frequency range to which the adjusted control resources belong;

allocate transmission resources to the target UE according to the control resource adjustment information and the time-frequency resource range for the original scheduling, a frequency range of the transmission resources including at least: a frequency range of the adjusted control resources; and perform information transmission with the target UE through the transmission resources.

Another aspect provides a UE, which includes:

a processor; and a memory configured to store instructions executed by the processor, where the processor is configured to:

receive control resource adjustment information sent by a base station, the control resource adjustment information being information of control resources adjusted by the base station based on original scheduling;

monitor, according to the control resource adjustment information, DCI in a time-frequency range to which the adjusted control resources belong; and perform information transmission according to the DCI by using transmission resources scheduled by the base station.

Figure 26:
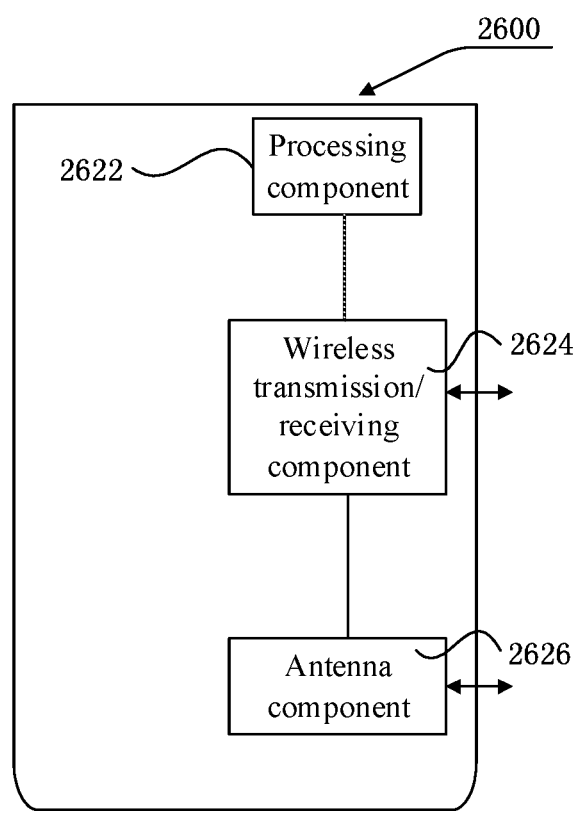
FIG. 26 is a structural schematic diagram illustrating a base station according to some embodiments of the present disclosure.

As illustrated in FIG. 26, FIG. 26 is a structural schematic diagram of a base station 2600 according to an embodiment. Referring to FIG. 26, the base station 2600 includes a processing component 2622, a wireless transmission/receiving component 2624, an antenna component 2626 and a wireless interface-specific signal processing part. The processing component 2622 may further include one or more processors.

One processor in the processing component 2622 may be configured to:

determine control resource adjustment information for a target UE, the control resource adjustment information being information of control resources adjusted based on original scheduling;

send the control resource adjustment information to the target UE to enable the target UE to monitor DCI in a time-frequency range to which the adjusted control resources belong;

allocate transmission resources to the target UE according to the control resource adjustment information and the time-frequency resource range for the original scheduling, a frequency range of the transmission resources including at least: a frequency range of the adjusted control resources; and perform information transmission with the target UE through the transmission resources.

In an embodiment, there is also provided a non-transitory computer readable storage medium having computer instructions stored thereon. The computer instructions may be executed by the processing component 2622 of the base station 2600 to complete the method for adjusting information transmission in any of FIG. 1 to FIG. 8. For example, the non-transitory computer-readable storage medium may be a ROM, a random access memory (RAM), a CD-ROM, a magnetic tape, a floppy disc, an optical data storage device and the like.

Figure 27:
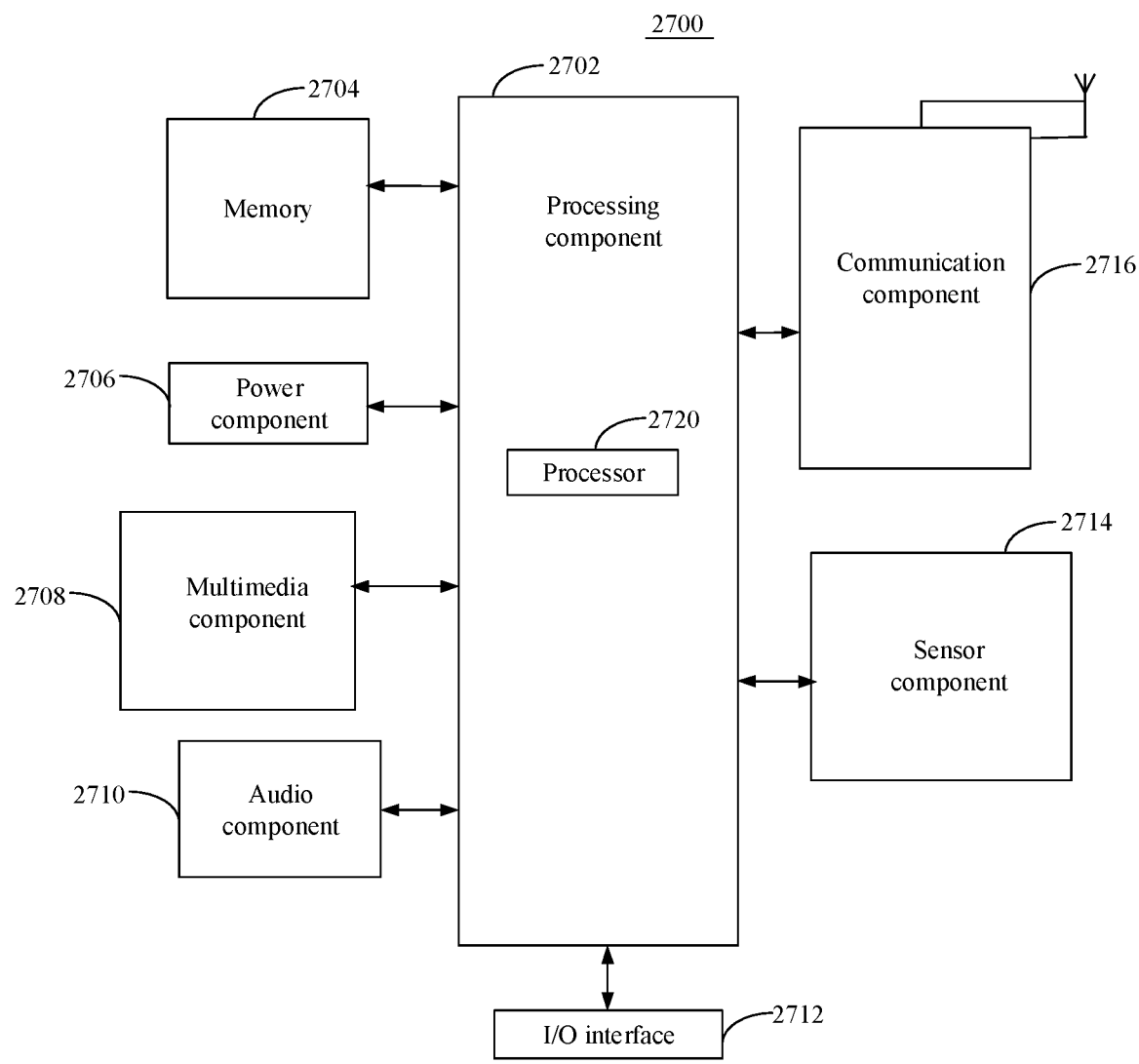
FIG. 27 is a structural schematic diagram illustrating a UE according to some embodiments of the present disclosure.

FIG. 27 is a structural schematic diagram illustrating a UE 2700 according to an embodiment. For example, the UE 2700 may be a terminal, and may specifically be a mobile phone, a computer, a digital broadcast terminal, a messaging device, a gaming console, a tablet, a medical device, exercise equipment, a personal digital assistant, or a wearable device such as a smart watch, smart glasses, a smart bracelet and smart running shoes.

Referring to FIG. 27, the UE 2700 may include one or more of the following components: a processing component 2702, a memory 2704, a power component 2706, a multimedia component 2708, an audio component 2710, an input/output (I/O) interface 2712, a sensor component 2714, and a communication component 2716.

The processing component 2702 typically controls overall operations of the UE 2700, such as the operations associated with display, telephone calls, data communications, camera operations, and recording operations. The processing component 2702 may include one or more processors 2720 to execute instructions to perform all or part of the steps in the above described methods. Moreover, the processing component 2702 may include one or more modules which facilitate the interaction between the processing component 2702 and other components. For example, the processing component 2702 may include a multimedia module to facilitate the interaction between the multimedia component 2708 and the processing component 2702.

The memory 2704 is configured to store various types of data to support the operations of the UE 2700. Examples of such data include instructions for any applications or methods operated on the UE 2700, contact data, phonebook data, messages, pictures, video, etc. The memory 2704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2706 provides power to various components of the UE 2700. The power component 2706 may include a power management system, one or more power sources, and any other components associated with the generation, management, and distribution of power in the UE 2700.

The multimedia component 2708 includes a screen providing an output interface between the UE 2700 and the user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 2708 includes a front camera and/or a rear camera. The front camera and/or the rear camera may receive external multimedia data when the device 2700 is in an operation mode, such as a photographing mode or a video mode. Each of the front camera and the rear camera may be a fixed optical lens system or have focusing and optical zooming capabilities.

The audio component 2710 is configured to output and/or input audio signals. For example, the audio component 2710 includes a microphone (MIC) configured to receive an external audio signal when the UE 2700 is in an operation mode, such as a call mode, a recording mode, and a voice recognition mode. The received audio signal may be further stored in the memory 2704 or transmitted via the communication component 2716. In some embodiments, the audio component 2710 further includes a speaker to output audio signals.

The I/O interface 2712 provides an interface between the processing component 2702 and peripheral interface modules, such as a keyboard, a click wheel, buttons, and the like. The buttons may include, but are not limited to, a home button, a volume button, a starting button, and a locking button.

The sensor component 2714 includes one or more sensors to provide status assessments of various aspects of the UE 2700. For instance, the sensor component 2714 may detect an on/off status of the device 2700 and relative positioning of components, such as a display and small keyboard of the UE 2700, and the sensor component 2714 may further detect a change in a position of the UE 2700 or a component of the UE 2700, presence or absence of contact between the user and the UE 2700, orientation or acceleration/deceleration of the UE 2700 and a change in temperature of the UE 2700. The sensor component 2714 may include a proximity sensor configured to detect presence of an object nearby without any physical contact. The sensor component 2714 may also include a light sensor, such as a complementary metal oxide semiconductor (CMOS) or charge coupled device (CCD) image sensor, configured for use in an imaging application. In some embodiments, the sensor component 2714 may also include an acceleration sensor, a gyroscope sensor, a magnetic sensor, a pressure sensor or a temperature sensor.

The communication component 2716 is configured to facilitate communication, wired or wirelessly, between the UE 2700 and other devices. The UE 2700 may access a wireless network based on a communication standard, such as WiFi, 2G, or 3G, or a combination thereof. In one embodiment, the communication component 2716 receives a broadcast signal or broadcast associated information from an external broadcast management system via a broadcast channel. In one embodiment, the communication component 2716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In the embodiments, the UE 2700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In the embodiments, there is also provided a non-transitory computer readable storage medium including instructions, such as included in the memory 2704, executable by the processor 2720 in the UE 2700, for performing the method for adjusting information transmission in any of FIG. 9 to FIG. 11. For example, the non-transitory computer-readable storage medium may be a ROM, a random access memory (RAM), a CD-ROM, a magnetic tape, a floppy disc, an optical data storage device and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method for adjusting information transmission, applied to a base station and comprising:
   determining control resource adjustment information for target user equipment (UE), the control resource adjustment information being information of control resources adjusted based on original scheduling, wherein the control resource adjustment information is used for the UE to configure a portion of the adjusted control resources not overlapped with control resources in the original scheduling;
   sending the control resource adjustment information to the target UE to enable the target UE to monitor downlink control information (DCI) within a time-frequency range to which the adjusted control resources belong;
   allocating transmission resources to the target UE according to the control resource adjustment information and a time-frequency resource range for the original scheduling, a frequency range of the transmission resources at least comprising: a frequency range of the adjusted control resources; and
   performing information transmission with the target UE through the transmission resources.

2. The method according to claim 1, wherein determining the control resource adjustment information for the target UE comprises:
   determining the control resource adjustment information according to an amount of information to be transmitted; or
   determining the control resource adjustment information in response to a scheduling adjustment request from the target UE.

3. The method according to claim 2, wherein determining the control resource adjustment information according to the amount of information to be transmitted comprises:
   comparing a present amount of information to be transmitted by the base station on a BWP with a first preset threshold to obtain a comparison result, wherein a time-frequency range of the BWP contains a time-frequency resource range for the original scheduling; and
   determining, in condition that the comparison result meets a first preset adjustment condition, the control resource adjustment information for the target UE.

4. The method according to claim 2, wherein determining the control resource adjustment information according to the amount of information to be transmitted comprises:
   determining a present amount of information to be transmitted for the target UE;
   comparing the present amount of information to be transmitted with a second preset threshold to obtain a comparison result; and
   determining, in condition that the comparison result meets a second preset adjustment condition, the control resource adjustment information for the target UE.

5. The method according to claim 2, wherein determining the control resource adjustment information in response to the scheduling adjustment request from the target UE comprises:
   receiving from the target UE a scheduling adjustment request for requesting to adjust a time-frequency range of control resources; and
   determining the control resource adjustment information for the target UE according to the scheduling adjustment request.

6. The method according to claim 5, wherein the scheduling adjustment request comprises: an identity of the control resources requested to be scheduled and
   determining the control resource adjustment information for the target UE according to the scheduling adjustment request comprises:
   determining the control resource adjustment information for the target UE according to the identity of the control resources requested to be scheduled.

7. The method according to claim 1, wherein determining the control resource adjustment information for the target UE comprises:
   adjusting a control resource range based on one or more control resource sets (CORESETs) provided for the original scheduling for the target UE; and
   generating the control resource adjustment information according to an adjustment result of the control resource range.

8. The method according to claim 7, wherein in condition that the time-frequency range of the control resources is adjusted from large to small, adjusting the control resource range comprises:
   in condition that at least two CORESETs are provided for the original scheduling, selecting one or more CORESETs from the at least two CORESETs, and determining the selected CORESET as a target CORESET; or
   in condition that at least one CORESET is provided for the original scheduling, selecting a part of control resources from the at least one CORESET, and determining the selected control resource as a target control resource region.

9. The method according to claim 8, wherein adjusting the control resource range further comprises:
   specifying a binding number of search resource element groups (REGs) for the target CORESET or the target control resource region;

wherein generating the control resource adjustment information according to the adjustment result of the control resource range comprises:
  generating the control resource adjustment information according to a time-frequency position of the target CORESET, a time-frequency position of the target control resource region or the binding number of search REGs.

10. The method according to claim 1, wherein allocating the transmission resources to the target UE according to the control resource adjustment information and the time-frequency resource range for the original scheduling comprises:
  allocating control information transmission resources to the target UE according to the control resource adjustment information; and
  allocating data transmission resources to the target UE according to the control resource adjustment information and the time-frequency resource range for the original scheduling.

11. The method according to claim 1, further comprising:
  canceling adjustment scheduling for control resources and resuming the original scheduling under a preset trigger condition;
  wherein the control resource adjustment information further comprises: a preset duration of the adjustment scheduling; and
  canceling the adjustment scheduling for the control resources and resuming the original scheduling under the preset trigger condition comprises:
  resuming the original scheduling in response to expiration of the preset duration.

12. A 5th-generation communication system implementing the method of claim 1, comprising the base station and the target UE, wherein:
  based on changes in traffic to be transmitted or energy saving requirements, the base station is configured to adjust the control resource range scheduled at a next time based on the original scheduling of the target UE at a previous time, to enable the target UE to monitor DCI used for the target UE within a time-frequency range to which newly scheduled control resources belong, so as to perform information transmission with the base station through transmission resources indicated by the DCI;
  part of the transmission scheduling information for the original scheduling including a time-frequency position of a CORESET is used as prior information in new scheduling, such that reconfiguration of the target UE is not performed, thereby shortening scheduling adjustment time, reducing control signaling overheads, saving wireless transmission resources and improving scheduling adjustment efficiency; and
  the target UE is therefore enabled to freely switch between broadband and narrowband devices.

13. A method for adjusting information transmission, applied to user equipment (UE), and comprising:
  receiving control resource adjustment information sent by a base station, the control resource adjustment information being information of control resources adjusted by the base station based on original scheduling, wherein the control resource adjustment information is used for the UE to configure a portion of the adjusted control resources not overlapped with control resources in the original scheduling;
  monitoring, according to the control resource adjustment information, downlink control information (DCI) in a time-frequency range to which the adjusted control resources belong; and
  performing, according to the DCI, information transmission by using transmission resources scheduled by the base station.

14. The method according to claim 13, wherein before receiving the control resource adjustment information sent by the base station, the method further comprises:
  sending to the base station a scheduling adjustment request for requesting the base station to adjust a time-frequency range of control resources.

15. The method according to claim 13, wherein the control resource adjustment information comprises at least one of the following:
  a time-frequency position of any one of one or more target control resource sets (CORESETs) of all CORESETs in a band width part (BWP);
  a time-frequency position of a part of control resource region in any one of one or more CORESETs of all the CORESETs; or
  a binding number of search resource element groups (REGs) for a target control resource.

16. The method according to claim 15, wherein monitoring, according to the control resource adjustment information, DCI in the time-frequency range to which the adjusted control resources belong comprises:
  searching for DCI for the UE from a control resource region corresponding to any one of the one or more target CORESETs; or
  searching for DCI for the UE from a part of control resource region in any one of the one or more CORESETs; or
  searching for, according to the binding number of search REGs, DCI for the UE from a control resource region corresponding to any one of the one or more target CORESETs or a part of control resource region in any one of the one or more CORESETs.

17. The method according to claim 13, wherein the control resource adjustment information further comprises: a preset duration of adjustment scheduling, the method further comprising:
  performing, in response to expiration of the preset duration, transmitting information transmission according to a time-frequency resource range for the original scheduling.

18. User equipment (UE), comprising:
  a processor; and
  memory for storing instructions executed by the processor,
  wherein the processor is configured to:
  receive control resource adjustment information sent by a base station, the control resource adjustment information being information of control resources adjusted by the base station based on original scheduling, wherein the control resource adjustment information is used for the UE to configure a portion of the adjusted control resources not overlapped with control resources in the original scheduling;
  monitor, according to the control resource adjustment information, downlink control information (DCI) in a time-frequency range to which the adjusted control resources belong; and
  perform information transmission according to the DCI by using transmission resources scheduled by the base station.

19. The UE according to claim 18, wherein the processor is further configured to:
- send to the base station a scheduling adjustment request for requesting the base station to adjust a time-frequency range of control resources.

20. The UE according to claim 18, wherein the control resource adjustment information comprises at least one of the following:
- a time-frequency position of any one of one or more target control resource sets (CORESETs) of all CORESETs in a band width part (BWP);
- a time-frequency position of a part of control resource regions in any one of one or more CORESETs of all the CORESETs; or
- a binding number of search resource element groups (REGs) for a target control resource;

wherein the processor is configured to:
- search for DCI for the UE from a part of control resource region corresponding to any one of the one or more target CORESETs; or
- search for DCI for the UE from a part of control resource region in any one of the one or more CORESETs; or
- search for, according to the binding number of search REGs, DCI for the UE from the control resource region corresponding to any one of the one or more target CORESET or a part of control resource regions in any one of the one or more CORESETs.

\* \* \* \* \*